United States Patent
Zheng

(10) Patent No.: US 11,310,780 B2
(45) Date of Patent: Apr. 19, 2022

(54) BANDWIDTH SCHEDULING METHOD AND APPARATUS

(71) Applicant: Huawei Technologies Co., Ltd., Shenzhen (CN)

(72) Inventor: Ruobin Zheng, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 255 days.

(21) Appl. No.: 16/809,017

(22) Filed: Mar. 4, 2020

(65) Prior Publication Data
US 2020/0205152 A1 Jun. 25, 2020

Related U.S. Application Data

(63) Continuation of application No. PCT/CN2018/104071, filed on Sep. 5, 2018.

(30) Foreign Application Priority Data

Sep. 5, 2017 (CN) .......................... 201710790790.1

(51) Int. Cl.
*H04L 12/24* (2006.01)
*H04W 72/04* (2009.01)
(Continued)

(52) U.S. Cl.
CPC ..... *H04W 72/0413* (2013.01); *H04L 41/0896* (2013.01); *H04L 69/18* (2013.01);
(Continued)

(58) Field of Classification Search
None
See application file for complete search history.

(56) References Cited

U.S. PATENT DOCUMENTS

| 7,751,437 B2 * | 7/2010 | Spinar ................... | H04W 28/20 370/468 |
| 8,027,298 B2 * | 9/2011 | Stanwood ............. | H04W 74/06 370/329 |

(Continued)

FOREIGN PATENT DOCUMENTS

| CN | 101772083 A | 7/2010 |
| CN | 102082976 A | 6/2011 |

(Continued)

OTHER PUBLICATIONS

Wang, X. et al., "Research on Dynamic Bandwith Allocation Scheme Based on QoS for GPON," Optical communication technology, 2006, 3 pages (With an English Abstract).

*Primary Examiner* — Jamaal Henson
(74) *Attorney, Agent, or Firm* — Slater Matsil, LLP

(57) ABSTRACT

A bandwidth scheduling method. The method includes a bandwidth allocation apparatus receives a bandwidth request message sent by a message conversion apparatus, where the bandwidth request message includes a bandwidth requirement, and the bandwidth requirement is a bandwidth required by a user-side apparatus for completing transmission of a service. The bandwidth allocation apparatus calculates first bandwidth grant information and second bandwidth grant information based on the bandwidth requirement, where the first bandwidth grant information is information about a bandwidth that is allocated to the user-side device, and the second bandwidth grant information is information about a bandwidth that is allocated to a second access device. The bandwidth allocation apparatus sends the first bandwidth grant information to the user-side device, and the bandwidth allocation apparatus sends the second bandwidth grant information to the second access device by using a first access device.

20 Claims, 11 Drawing Sheets

(51) Int. Cl.
*H04L 69/18* (2022.01)
*H04Q 11/00* (2006.01)
*H04L 41/0896* (2022.01)

(52) U.S. Cl.
CPC ...... *H04Q 11/0067* (2013.01); *H04W 72/044* (2013.01); *H04Q 2011/0086* (2013.01)

(56) References Cited

U.S. PATENT DOCUMENTS

| | | | | |
|---|---|---|---|---|
| 2003/0048801 A1* | 3/2003 | Sala | .................... | H04B 10/272 370/445 |
| 2003/0048805 A1* | 3/2003 | Yoshihara | ............. | H04J 3/1694 370/468 |
| 2003/0133460 A1* | 7/2003 | Lee | .................... | H04Q 11/0067 370/395.43 |
| 2003/0179769 A1* | 9/2003 | Shi | ........................ | H04J 3/1694 370/442 |
| 2004/0057462 A1* | 3/2004 | Lim | ...................... | H04J 3/1694 370/468 |
| 2004/0146301 A1* | 7/2004 | Choi | .................. | H04Q 11/0067 398/58 |
| 2007/0019957 A1* | 1/2007 | Kim | .................... | H04Q 11/0067 398/72 |
| 2007/0189771 A1* | 8/2007 | Kim | ...................... | H04J 3/1694 398/69 |
| 2008/0205443 A1* | 8/2008 | Shi | ..................... | H04Q 11/0067 370/468 |
| 2008/0259857 A1* | 10/2008 | Zheng | .................... | H04B 7/155 370/329 |
| 2009/0162063 A1* | 6/2009 | Mizutani | ............... | H04J 3/0682 398/58 |
| 2009/0317082 A1 | 12/2009 | Kimura et al. | | |
| 2010/0237255 A1* | 9/2010 | Monro | ................... | G01N 21/00 250/459.1 |
| 2011/0085799 A1* | 4/2011 | Mizutani | ............ | H04Q 11/0067 398/37 |
| 2011/0116803 A1* | 5/2011 | Sone | ................... | H04Q 11/0067 398/98 |
| 2012/0051371 A1* | 3/2012 | Sarashina | .......... | H04Q 11/0067 370/468 |
| 2012/0051752 A1* | 3/2012 | Tamai | ................ | H04Q 11/0067 398/99 |
| 2013/0239165 A1 | 9/2013 | Garavaglia et al. | | |
| 2014/0133855 A1* | 5/2014 | Chaffins | ............ | H04Q 11/0067 398/58 |
| 2016/0277142 A1* | 9/2016 | Doo | ..................... | H04B 10/27 |
| 2019/0273975 A1* | 9/2019 | Lin | ..................... | H04J 14/0236 |

FOREIGN PATENT DOCUMENTS

| | | |
|---|---|---|
| CN | 103534981 A | 1/2014 |
| CN | 104735555 A | 6/2015 |
| CN | 105933064 A | 9/2016 |

* cited by examiner

BANDWIDTH SCHEDULING METHOD AND APPARATUS

CROSS-REFERENCE TO RELATED APPLICATIONS

This application is a continuation of International Application No. PCT/CN2018/104071, filed on Sep. 5, 2018, which claims priority to Chinese Patent Application No. 201710790790.1, filed on Sep. 5, 2017. The disclosures of the aforementioned applications are hereby incorporated by reference in their entireties.

TECHNICAL FIELD

This application relates to the field of communications technologies, and in particular, to a bandwidth scheduling method and an apparatus.

BACKGROUND

FIG. 1 is a schematic diagram of an existing bandwidth scheduling method. As shown in FIG. 1, in the existing bandwidth scheduling method, a user-side device sends a first bandwidth request message to a second access device, where the first bandwidth request message includes a bandwidth requirement of the user-side device. After receiving the first bandwidth request message, the second access device allocates a bandwidth to the user-side device based on the bandwidth requirement of the user-side device. The second access device sends a first bandwidth response message to the user-side device, where the first bandwidth response message carries information about the bandwidth allocated to the user-side device. The user-side device may send uplink data to the second access device based on the obtained bandwidth information. After receiving the uplink data, the second access device sends a second bandwidth request message to a first access device, to request a bandwidth used for sending the uplink data, where the second bandwidth request message includes a bandwidth requirement of the second access device, and the bandwidth requirement of the second access device is a bandwidth requirement used for sending the uplink data of the user-side device. After receiving the second bandwidth request message, the first access device allocates the bandwidth to the second access device. The first access device sends a second bandwidth response message to the user-side device, where the second bandwidth response message carries information about the bandwidth allocated to the second access device. The second access device sends the uplink data to the first access device based on the obtained bandwidth information. The user-side device may be a cable modem (CM) or user equipment (UE). The second access device may be an optical network unit (ONU). The first access device may be an optical line terminal (OLT). In the foregoing process in which the CM sends the uplink data, dynamic bandwidth allocation (DBA) needs to be performed twice and communication interaction needs to be performed a plurality of times. Consequently, an uplink data transmission delay is increased.

SUMMARY

Embodiments of this application provide a bandwidth scheduling method and an apparatus, to help reduce an uplink data transmission delay and improve bandwidth allocation efficiency.

According to a first aspect, a bandwidth scheduling method is provided, where the method includes receiving, by a bandwidth allocation apparatus, a bandwidth request message sent by a message conversion apparatus, where the bandwidth request message includes a bandwidth requirement, and the bandwidth requirement is a bandwidth used for completing transmission of a service, calculating, by the bandwidth allocation apparatus, first bandwidth grant information and second bandwidth grant information based on the bandwidth requirement, where the first bandwidth grant information is information about a bandwidth that is allocated to a user-side device and that corresponds to the service, and the second bandwidth grant information is information about a bandwidth that is allocated to a second access device and that corresponds to the service, and sending, by the bandwidth allocation apparatus, a first bandwidth response message to the message conversion apparatus, and sending a second bandwidth response message to a first access device, where the first bandwidth response message includes the first bandwidth grant information, and the second bandwidth response message includes the second bandwidth grant information.

In the foregoing method, the bandwidth allocation apparatus directly allocates corresponding bandwidths to the user-side device and the second access device based on the bandwidth request message reported by the message conversion apparatus, sends the first bandwidth grant information to the message conversion apparatus, and sends the second bandwidth grant information to the first access device. In this way, in a process of uplink communication between the message conversion apparatus and the first access device, there is no need to perform bandwidth requesting and exchange a plurality of times. Therefore, a transmission delay caused by a bandwidth request process is reduced, and bandwidth allocation efficiency is improved.

In an implementation, the message conversion apparatus is disposed on the second access device, or the message conversion apparatus is disposed outside the second access device. In a passive optical network (PON) system, the user-side device may be a CM, and the second access device may be an ONU with a built-in cable television cable device, a cable modem termination system (CMTS), or a converged cable access platform (CCAP). In a wireless network system, the user-side device may be UE, and the second access device may be an ONU having a wireless access point (AP) function or a base station (BS) function.

In an implementation, the first bandwidth grant information includes at least one of first time information and first frequency information. The first time information includes a start point of a first time slice and a length of the first time slice, and the first frequency information includes a center frequency of a first frequency band and a frequency width of the first frequency band. The start point of the first time slice is a start moment at which the user-side device sends the service, the length of the first time slice is effective duration in which the user-side device sends the service, and the first frequency band is a frequency range within which the user-side device sends the service.

In an implementation, the second bandwidth grant information includes at least one of second time information and second frequency information. The second time information includes a start point of a second time slice and a length of the second time slice, and the second frequency information includes a center frequency of a second frequency band and a frequency width of the second frequency band. The start point of the second time slice is a start moment at which the second access device sends the service, the length of the second time slice is effective duration in which the second access device sends the service, and the second frequency band is a frequency range within which the second access device sends the service. The start point of the second time slice may be determined based on the start point of the first time slice and the length of the first time slice. For example, the start point of the second time slice is a moment obtained by adding the length of the first time slice and the start point of the first time slice. Optionally, when the start point of the second time slice is determined, a transmission delay generated by the user-side device may be further considered. To be specific, the start point of the second time slice is a moment obtained by adding the start point of the first time slice, the length of the first time slice, and the transmission delay generated by the user-side device.

In an implementation, the bandwidth request message further includes at least one of a service identifier and priority information, the priority information is used to identify a priority of the service, and the service identifier is used to identify the service. The service identifier may be 5-tuple information in the bandwidth request message, where the 5-tuple information may be used to identify a service, or the service identifier may be information carried in a message body.

In an implementation, the first bandwidth response message and the second bandwidth response message are internet protocol (IP)-based messages, or the first bandwidth response message and the second bandwidth response message are Ethernet encapsulation messages.

In an implementation, a message header of the bandwidth request message includes a destination address, a source address, and first type information, where the destination address is an address of the bandwidth allocation apparatus, the source address is an address of the message conversion apparatus, and the first type information is used to indicate that the message body carries a bandwidth request-related parameter. A message body of the bandwidth request message includes the bandwidth requirement. Optionally, the message body of the bandwidth request message further includes at least one of a service identifier and a service type.

In an implementation, a message header of the first bandwidth response message includes a destination address, a source address, and second type information, where the source address is the address of the bandwidth allocation apparatus, the destination address is the address of the message conversion apparatus, and the second type information is used to indicate that the message body carries a bandwidth grant-related parameter. A message body of the first bandwidth response message includes the first bandwidth grant information. Optionally, the message body of the first bandwidth response message further includes at least one of a service identifier and a service type.

In an implementation, a message header of the second bandwidth response message includes a destination address, a source address, and second type information, where the source address is the address of the bandwidth allocation apparatus, the destination address is the address of the message conversion apparatus, and the second type information is used to indicate that the message body carries the bandwidth grant-related parameter. A message body of the second bandwidth response message includes the second bandwidth grant information. Optionally, the message body of the second bandwidth response message further includes at least one of a service identifier and a service type.

In an implementation, the method further includes receiving, by the message conversion apparatus, a third bandwidth response message sent by the first access device, where the third bandwidth response message includes the second bandwidth grant information. The third bandwidth response message and the first bandwidth response message are based on different protocol types. In this way, after the message conversion apparatus receives the third bandwidth response message, the second access device at which the message conversion apparatus is located may reserve the bandwidth for the user-side device based on the second bandwidth grant information, to further reduce a transmission delay.

According to a second aspect, a bandwidth scheduling method is provided, where the method includes receiving, by a message conversion apparatus, a second bandwidth request message sent by a user-side device, where the second bandwidth request message includes a first bandwidth requirement, and the first bandwidth requirement is a bandwidth used for completing transmission of a first service, obtaining, by the message conversion apparatus, a first bandwidth request message based on the second bandwidth request message, where the first bandwidth request message includes the first bandwidth requirement, sending, by the message conversion apparatus, the first bandwidth request message to a bandwidth allocation apparatus, receiving, by the message conversion apparatus, a first bandwidth response message sent by the bandwidth allocation apparatus, where the first bandwidth response message includes first bandwidth grant information, and the first bandwidth grant information is information about a bandwidth that is allocated to the user-side device and that corresponds to the first service, obtaining, by the message conversion apparatus, a second bandwidth response message based on the first bandwidth response message, where the second bandwidth response message includes the first bandwidth grant information, and sending, by the message conversion apparatus, the second bandwidth response message to the user-side device.

In the foregoing method, the message conversion apparatus may perform protocol conversion on the second bandwidth request message from the user-side device, to obtain the first bandwidth request message. The message conversion apparatus may no longer send the first bandwidth request message to a first access device, but directly send the first bandwidth request message to the bandwidth allocation apparatus, to trigger the bandwidth allocation apparatus to allocate corresponding bandwidth information to the user-side device and the second access device. This simplifies a procedure of currently allocating bandwidths to the message conversion apparatus and the first access device, improves bandwidth allocation efficiency, and reduce a latency caused to data transmission in a process of allocating a bandwidth to the message conversion apparatus.

In an implementation, the first bandwidth grant information is the same as the first bandwidth grant information in the first aspect.

In an implementation, the second bandwidth request message further includes first priority information, where the first priority information is used to identify a priority of a first service. For example, the message conversion apparatus may generate a new bandwidth request message and sort a sending sequence based on the first priority information. If the first priority information is high, the message conversion apparatus preferentially generates the first bandwidth request message and preferentially sends the first bandwidth request message to the bandwidth allocation apparatus.

In an implementation, the first bandwidth request message further includes the first priority information. If the first priority information is high, the bandwidth allocation apparatus may preferentially process the first bandwidth request message, to obtain the first bandwidth grant information and the second bandwidth grant information.

In an implementation, the second bandwidth request message further includes a first service identifier, and the first service identifier is used to identify the first service. The first service identifier may be 5-tuple information carried in a message header of the second bandwidth request message, or the first service identifier may be an identifier carried in a message body of the second bandwidth request message.

In an implementation, the first bandwidth request message further includes the first service identifier. If service identifiers are all represented by using 5-tuple information in a message header, 5-tuple included in the first bandwidth request message is not the same as 5-tuple included in the second bandwidth request message, but the 5-tuple included in the first bandwidth request message can still be used to represent the first service identifier. A message body of the first bandwidth request message may be the same as the message body of the second bandwidth request message, that is, the first service identifier may also be carried in the message body of the first bandwidth request message.

In an implementation, the first bandwidth request message and the first bandwidth response message are based on a same protocol, and the first bandwidth request message is based on an IP or an Ethernet protocol, and the second bandwidth request message and the first bandwidth request message are based on different protocols, and the second bandwidth response message and the second bandwidth request message are based on a same protocol. For example, the message header of the first bandwidth request message is different from the message header of the second bandwidth request message, and the message body of the first bandwidth request message is the same as the message body of the second bandwidth request message. A message header of the first bandwidth response message is different from a message header of the second bandwidth response message, and a message body of the first bandwidth response message is the same as a message body of the second bandwidth response message.

In an implementation, the first bandwidth response message further includes the second bandwidth grant information, where the second bandwidth grant information is information about a bandwidth that is allocated to the user-side device and that corresponds to a second service, and the method further includes receiving, by the message conversion apparatus, a second bandwidth requirement sent by the user-side device, where the second bandwidth requirement is a bandwidth used for completing transmission of the second service, adding, by the message conversion apparatus, the second bandwidth requirement to the first bandwidth request message, obtaining, by the message conversion apparatus, the second bandwidth grant information from the first bandwidth response message, and sending, by the message conversion apparatus, the second bandwidth grant information to the user-side device.

In an implementation, the second bandwidth requirement may be carried in the message body of the second bandwidth request message. The second bandwidth grant information may be carried in the message body of the second bandwidth response message.

According to a third aspect, a bandwidth allocation apparatus is provided, where the bandwidth allocation apparatus includes a receiving unit, configured to receive a bandwidth request message sent by an optical network module message conversion apparatus, where the bandwidth request message includes a bandwidth requirement, and the bandwidth requirement is a bandwidth used for completing transmission of a service, a calculation unit, configured to calculate first bandwidth grant information and second bandwidth grant information based on the bandwidth requirement, where the first bandwidth grant information is information about a bandwidth that is allocated to a user-side device and that corresponds to the service, the second bandwidth grant information is information about a bandwidth that is allocated to a second access device and that corresponds to the service, and the second access device is a device at which the message conversion apparatus is located, and a sending unit, configured to send a first bandwidth response message to the message conversion apparatus, and send a second bandwidth response message to a first access device, where the first bandwidth response message includes the first bandwidth grant information, and the second bandwidth response message includes the second bandwidth grant information.

In an implementation, the bandwidth request message further includes at least one of a service identifier and priority information, the priority information is used to identify a priority of the service, and the service identifier is used to identify the service.

The first bandwidth grant information is the same as the first bandwidth grant information in the first aspect. The second bandwidth grant information is the same as the second bandwidth grant information in the second aspect.

According to a fourth aspect, a message conversion apparatus is provided, where the message conversion apparatus includes a first receiving unit, configured to receive a second bandwidth request message sent by a user-side device, where the second bandwidth request message includes a first bandwidth requirement, and the first bandwidth requirement is a bandwidth used for completing transmission of a first service, a first conversion unit, configured to obtain a first bandwidth request message based on the second bandwidth request message, where the first bandwidth request message includes the first bandwidth requirement, a first sending unit, configured to send the first bandwidth request message to a bandwidth allocation apparatus, a second receiving unit, configured to receive a first bandwidth response message sent by the bandwidth allocation apparatus, where the first bandwidth response message includes first bandwidth grant information, and the first bandwidth grant information is information about a bandwidth that is allocated to the user-side device and that corresponds to the first service, a second conversion unit, configured to obtain a second bandwidth response message based on the first bandwidth response message, where the second bandwidth response message includes the first bandwidth grant information, and a second sending unit, configured to send the second bandwidth response message to the user-side device.

In an implementation, the first bandwidth request message further includes at least one of a first service identifier and first priority information, where the first priority information is used to identify a priority of a first service, and the first service identifier is used to identify the first service.

In an implementation, the first bandwidth request message and the first bandwidth response message are based on a same protocol, and the first bandwidth request message is based on an IP or an Ethernet protocol, and the second bandwidth request message and the first bandwidth request message are based on different protocols, and the second bandwidth response message and the second bandwidth request message are based on a same protocol.

In an implementation, the first bandwidth response message further includes second bandwidth grant information, and the second bandwidth grant information is information about a bandwidth that is allocated to the user-side device and that corresponds to a second service, the first receiving unit is further configured to receive a second bandwidth requirement sent by the user-side device, where the second bandwidth requirement is a bandwidth used for completing transmission of the second service, the first conversion unit is further configured to add the second bandwidth requirement to the first bandwidth request message, the second conversion unit is further configured to obtain the second bandwidth grant information from the first bandwidth response message, and the second sending unit is further configured to send the second bandwidth grant information to the user-side device.

The first bandwidth request message in the fourth aspect is the same as the first bandwidth message in the second aspect, and the second bandwidth request message in the fourth aspect is the same as the second bandwidth request message in the second aspect. The first bandwidth response message in the fourth aspect is the same as the first bandwidth response message in the second aspect, and the second bandwidth grant information in the fourth aspect is the same as the second bandwidth grant information in the second aspect.

In an implementation, the message conversion apparatus is disposed on a second access device, or the message conversion apparatus is disposed outside the second access device.

In any implementation of this application, information about a bandwidth corresponding to a service is information about a bandwidth used for transmitting the service, and the user-side device is an apparatus that is disposed on a user side and that can communicate with the second access device.

According to a fifth aspect, a bandwidth scheduling system is provided, where the system includes the bandwidth allocation apparatus provided in any one of the third aspect or the implementations of the third aspect, and the message conversion apparatus provided in any one of the fourth aspect or the implementations of the fourth aspect.

According to a sixth aspect, a bandwidth allocation apparatus is provided, where the bandwidth allocation apparatus includes a processor, a memory, and a communications interface. The processor, the memory, and the communications interface may communicate with each other through a communications bus. The processor may read an instruction from the memory, to implement the method step included in any one of the first aspect or the implementations of the first aspect.

According to a seventh aspect, a message conversion apparatus is provided, where the message conversion apparatus includes a processor, a memory, and a communications interface. The processor, the memory, and the communications interface may communicate with each other through a communications bus. The processor may read an instruction from the memory, to implement the method step included in any one of the second aspect or the implementations of the second aspect.

According to an eighth aspect, a second access device is provided, where the second access device includes the message conversion apparatus provided in the fourth aspect or any implementation of the fourth aspect.

In an implementation, the second access device further includes a third receiving unit and a bandwidth configuration unit. The third receiving unit is configured to receive a third bandwidth response message sent by a first receiving device, where the third bandwidth response message includes third bandwidth grant information, the third bandwidth grant information is information about a bandwidth that is allocated to the second access device and that corresponds to the first service, and the bandwidth configuration unit is configured to complete bandwidth configuration based on the third bandwidth grant information.

The third bandwidth grant information is the same as the second bandwidth grant information in any one of the first aspect or the implementations of the first aspect.

According to a ninth aspect, a first access device is provided, where the first access device includes a receiving unit, a conversion unit, and a sending unit. The receiving unit is configured to receive a first bandwidth response message sent by a bandwidth allocation apparatus, where the first bandwidth response message includes bandwidth grant information, and the bandwidth grant information is information about a bandwidth that is allocated to a second access device and that corresponds to a service. The conversion unit is configured to perform protocol format conversion on the first bandwidth response message, to obtain a second bandwidth response message, where the second bandwidth response message includes the bandwidth grant information. The sending unit is configured to send the second bandwidth response message to the second access device.

In an implementation, the first bandwidth response message and the second bandwidth response message are based on different protocols, the first bandwidth response message may be an IP-based message, and the second bandwidth response message may be a passive optical network (PON) message.

According to a tenth aspect, a bandwidth scheduling system is provided, where the system includes the second access device according to any one of the eighth aspect or the implementations of the eighth aspect and the first access device according to any one of the ninth aspect or the implementation of the ninth aspect.

DETAILED DESCRIPTION OF ILLUSTRATIVE EMBODIMENTS

The following clearly describes the technical solutions in the embodiments of this application with reference to the accompanying drawings in the embodiments of this application.

An embodiment of this application provides a bandwidth scheduling method. In the method, a message conversion apparatus receives a second bandwidth request message sent by a user-side device, where the second bandwidth request message includes a first bandwidth requirement, and the first bandwidth requirement is a bandwidth used for completing transmission of a first service, the message conversion apparatus obtains a first bandwidth request message based on the second bandwidth request message, where the first bandwidth request message includes the first bandwidth requirement, the message conversion apparatus sends the first bandwidth request message to a bandwidth allocation apparatus, the bandwidth allocation apparatus receives the first bandwidth request message sent by the message conversion apparatus, the bandwidth allocation apparatus calculates first bandwidth grant information and second bandwidth grant information based on the first bandwidth requirement, where the first bandwidth grant information is information about a bandwidth that is allocated to the user-side device and that corresponds to the service, and the second bandwidth grant information is information about a bandwidth that is allocated to a second access device and that corresponds to the service, and the bandwidth allocation apparatus sends a first bandwidth response message to the message conversion apparatus, and sends a second bandwidth response message to a first access device, where the first bandwidth response message includes the first bandwidth grant information, and the second bandwidth response message includes the second bandwidth grant information.

Embodiment 1

Figure 1:
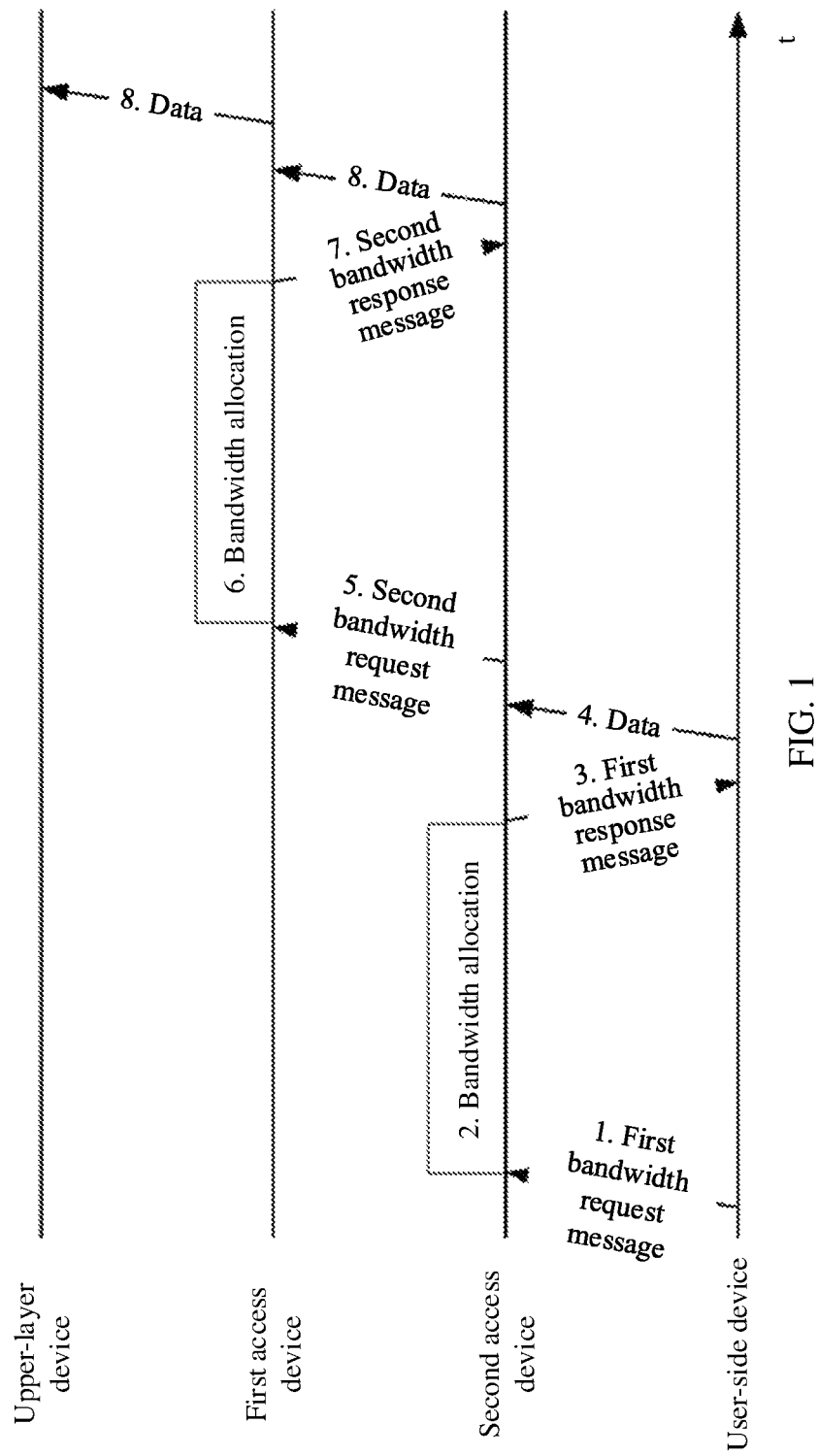
FIG. 1 is a schematic diagram of an existing bandwidth scheduling method.
Figure 2A:
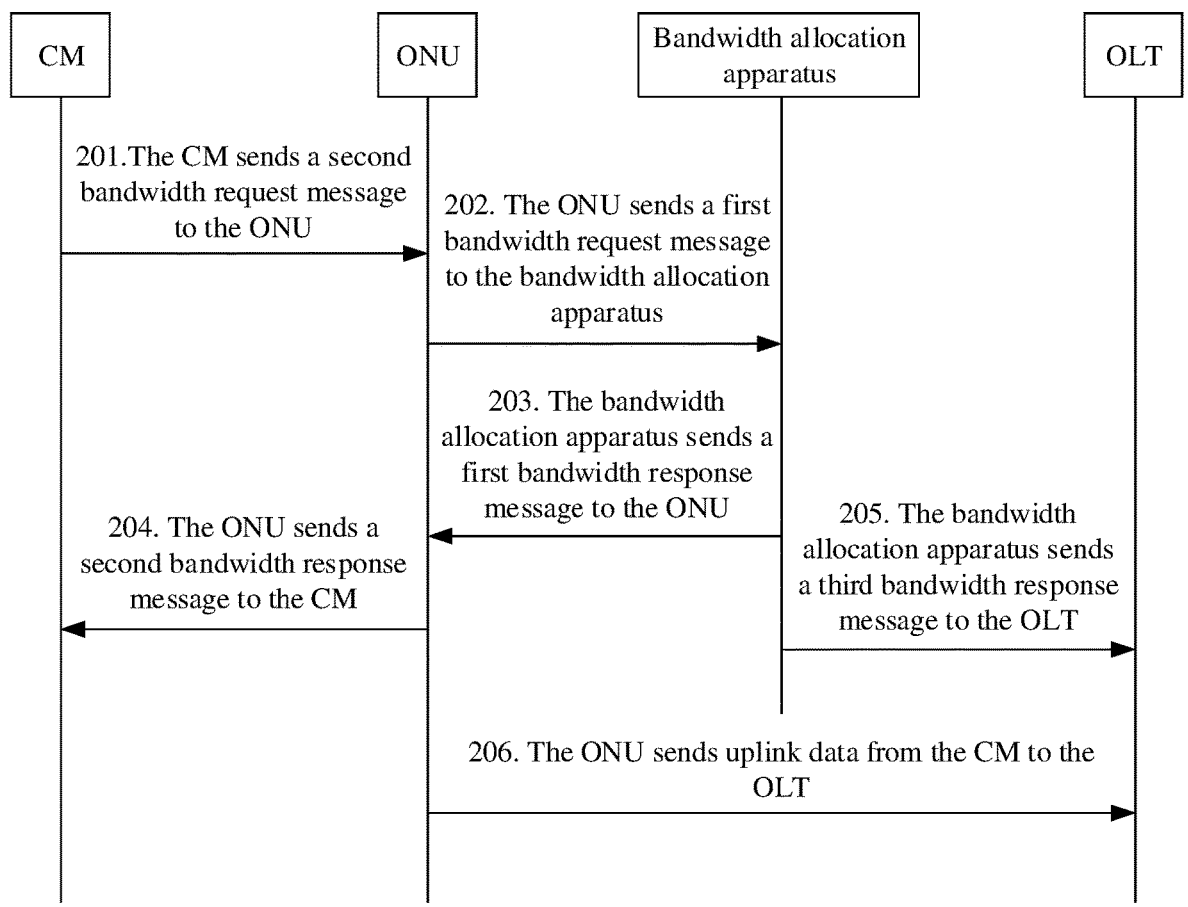
FIG. 2(a) is a flowchart of a bandwidth scheduling method according to Embodiment 1 of this application.

FIG. 2(a) is a flowchart of a bandwidth scheduling method according to Embodiment 1 of this application. In this embodiment, a user-side device is a CM, a first access device is an OLT, a message conversion apparatus is disposed on a second access device, and the second access device is an ONU. An action related to message conversion and performed by the ONU in Embodiment 1 may be performed by the message conversion apparatus included in the ONU. It may be understood that, in another implementation, the user-side device may be another device having a function of the CM in Embodiment 1. Likewise, in the another implementation, the first access device and the second access device may be other devices having functions of the OLT and the ONU device in Embodiment 1. The following describes the bandwidth scheduling method provided in Embodiment 1 of this application with reference to FIG. 2(a).

201. The CM sends a second bandwidth request message to the ONU.

For example, the second bandwidth request message includes a first bandwidth requirement, and the first bandwidth requirement is a bandwidth used for completing transmission of a first service. Optionally, the second bandwidth request message may further include at least one of a first service identifier and first priority information, the first service identifier is used to identify the first service, and the first priority information is used to identify a priority of a first service. The second bandwidth request message may be a data over cable service interface specification (DOCSIS) bandwidth request message. A message body of the second bandwidth request message includes a field used to carry the first bandwidth requirement. Optionally, the message body of the second bandwidth request message further includes a field used to carry the first service identifier.

Optionally, the at least one of the first service identifier and the first priority information may be placed in a message header of the second bandwidth request message, provided that the at least one of the first service identifier and the first priority information can be transferred to a bandwidth allocation apparatus.

For example, the second bandwidth request message may be a message based on the data over cable service interface specification (DOCSIS), a message based on a passive optical network (PON), or a message based on wireless communication.

202. The ONU sends a first bandwidth request message to the bandwidth allocation apparatus.

For example, the ONU obtains the first bandwidth request message based on the first bandwidth requirement carried in the second bandwidth request message. The first bandwidth request message is a message obtained after protocol conversion is performed on the second bandwidth request message. The first bandwidth request message may be an internet protocol (IP)-based message. The first bandwidth requirement may be carried in a message body of the first bandwidth request message. The first bandwidth request message may be encapsulated based on the IP or Ethernet protocol.

A destination address of the first bandwidth request message is an address of the bandwidth allocation apparatus. A source address of the first bandwidth request message is an address of the ONU. Specifically, the source address of the first bandwidth request message may be an address of a module responsible for message conversion in the ONU. The first bandwidth request message further includes first type information, and the first type information is used to indicate that the message is a bandwidth-related message.

Figure 3A:
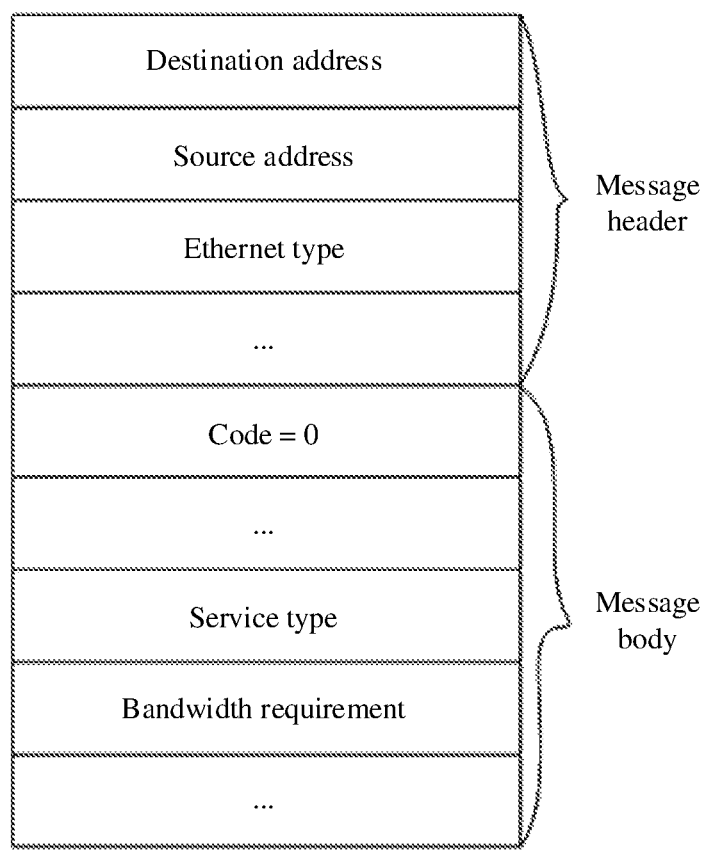
FIG. 3(a) is a schematic diagram of a format of a first bandwidth request message according to an embodiment of this application.

As shown in FIG. 3 (a), a message header of the first bandwidth request message may include the destination address, the source address, and the first type information. The message body of the first bandwidth request message may include the first bandwidth requirement. Optionally, the message body of the first bandwidth request message may further include at least one of a service type and the first service identifier. The message body of the first bandwidth request message may further include second type information, and the second type information is used to indicate that the message body carries a parameter used to request a bandwidth. If the first bandwidth request message is an Ethernet-based message, the first type information is carried in an Ethernet type field, and a code field in the message body is used to carry the second type information. A value 0 of a code shown in FIG. 3(a) is merely used as an example, indicating that the message is a bandwidth request message. The code may also have another value to indicate that the message is a bandwidth request message. Examples are not described one by one herein.

203. The bandwidth allocation apparatus sends a first bandwidth response message to the ONU.

For example, the bandwidth allocation apparatus calculates first bandwidth grant information and second bandwidth grant information based on the first bandwidth requirement in the first bandwidth request message. The first bandwidth grant information is information about a bandwidth that is allocated to the CM and that corresponds to the first service. The second bandwidth grant information is information about a bandwidth that is allocated to the ONU and that corresponds to the first service. Specifically, the bandwidth allocation apparatus may obtain the first bandwidth grant information and the second bandwidth grant information based on a common DBA algorithm. Examples are not described herein.

For example, the first bandwidth grant information includes at least one of first time information and first frequency information. The first time information includes a start point of a first time slice and a length of the first time slice, and the first frequency information includes a center frequency of a first frequency band and a frequency width of the first frequency band. The start point of the first time slice is a start moment at which the CM sends the service, the length of the first time slice is effective duration in which the CM sends the service, and the first frequency band is a frequency range within which the CM sends the service.

For example, the second bandwidth grant information includes at least one of second time information and second frequency information. The second time information includes a start point of a second time slice and a length of the second time slice, and the second frequency information includes a center frequency of a second frequency band and a frequency width of the second frequency band. The start point of the second time slice is a start moment at which the ONU sends the service, the length of the second time slice is effective duration in which the ONU sends the service, and the second frequency band is a frequency range within which the ONU sends the service.

The start point of the second time slice may be determined based on the start point of the first time slice and the length of the first time slice. For example, the start point of the second time slice is a moment obtained by adding the length of the first time slice and the start point of the first time slice. Optionally, when the start point of the second time slice is determined, a transmission delay generated by the CM may be further considered. To be specific, the start point of the second time slice is a moment obtained by adding the start point of the first time slice, the length of the first time slice, and the transmission delay generated by the CM.

To ensure high efficiency of the OLT and the ONU in a process of processing uplink data, the first bandwidth grant information and the second bandwidth grant information include parameters of a same type. If the first bandwidth grant information includes the first time information, the second bandwidth grant information includes the second time information. If the first bandwidth grant information includes the first frequency information, the second bandwidth grant information includes the second frequency information.

Figure 3B:
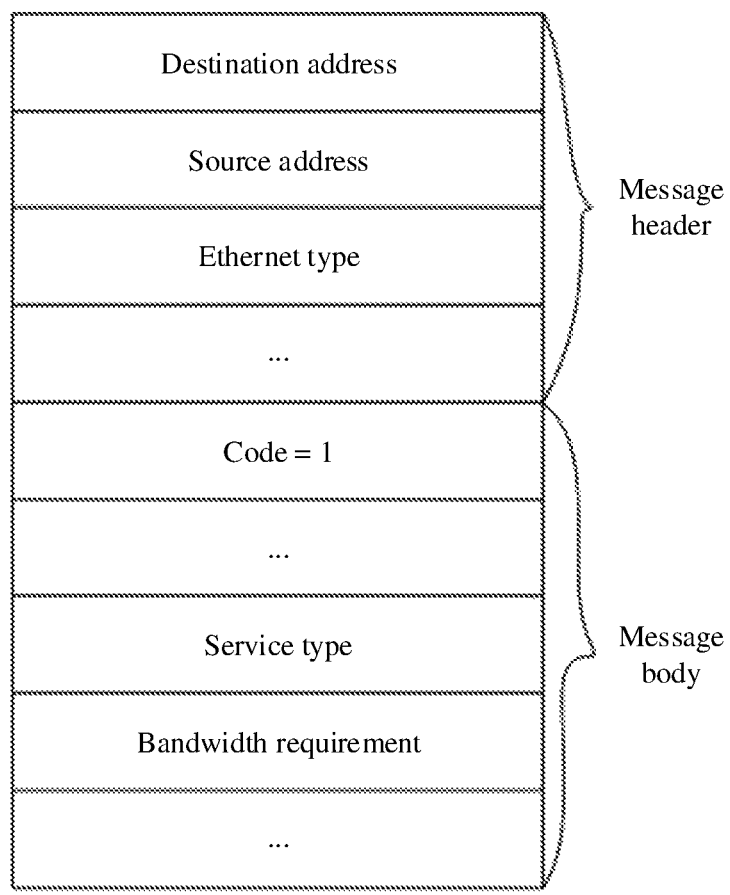
FIG. 3(b) is a schematic diagram of a format of a first bandwidth response message according to an embodiment of this application.

As shown in FIG. 3(b), the first bandwidth response message includes a message header and a message body. The message header of the first bandwidth response message includes a destination address, a source address, and first type information. The destination address is the address of the ONU. Specifically, the destination address is an address of a module, configured to convert a protocol type of a message, in the ONU. The source address is the address of the bandwidth allocation apparatus. The first type information is used to indicate that the message is a bandwidth-related message. The message body of the first bandwidth response message includes the first bandwidth grant information and second type information. The second type information is used to indicate that a parameter used to allocate a bandwidth is carried. If the first bandwidth response message is encapsulated based on the Ethernet, the first type information is carried in an Ethernet type field of the message header, and the second type information is carried in a code field of the message body. A value 1 of a code shown in FIG. 3(b) is merely used as an example, indicating that the message is a bandwidth response message. The code may also have another value to indicate that the message is a bandwidth response message. Examples are not described one by one herein.

204. The ONU sends a second bandwidth response message to the CM.

For example, the ONU converts the first bandwidth response message into the second bandwidth response message based on a protocol used for the second bandwidth request message. A protocol on which the second bandwidth response message is based is the same as the protocol on which the second bandwidth request message is based. A format of the second bandwidth response message is not described herein again. The second bandwidth response message includes the first bandwidth grant information.

205. The bandwidth allocation apparatus sends a third bandwidth response message to the OLT.

For example, the bandwidth allocation apparatus generates the third bandwidth response message according to a communication protocol used by the OLT. The third bandwidth response message includes the second bandwidth grant information. The third bandwidth response message may be an IP-based message, or the third bandwidth response message may be encapsulated based on the Ethernet.

For example, after receiving the third bandwidth response message, the OLT may perform format conversion on the third bandwidth response message. To be specific, based on a communication protocol between the OLT and the ONU, the OLT converts the third bandwidth response message into a fourth bandwidth response message that can be identified by the ONU, where the fourth bandwidth response message includes the second bandwidth grant information, and the OLT sends the fourth bandwidth response message to the ONU.

For example, the bandwidth allocation apparatus may send the third bandwidth response message to the OLT before, after, or at the same time as sending the first bandwidth response message. Step 205 and step 203 in this embodiment of this application do not represent a sequence, but the sequence numbers are used to distinguish between different steps.

206. The ONU sends the uplink data from the CM to the OLT.

For example, the CM may complete bandwidth configuration for the CM itself after obtaining the first bandwidth grant information, and the ONU may complete bandwidth configuration for the ONU itself after obtaining the second bandwidth grant information. The CM may send the uplink data to the ONU based on a bandwidth configured by the CM. After the ONU receives the uplink data sent by the CM, the ONU may send the uplink data to the OLT based on a bandwidth configured by the ONU. The OLT may directly forward the uplink data from the ONU. In this way, when the uplink data is sent to the OLT, there is no need to wait for a procedure in which the OLT applies for bandwidth allocation. This helps reduce a transmission delay and improve bandwidth allocation efficiency.

According to the bandwidth scheduling method provided in this embodiment of this application, the bandwidth allocation apparatus allocates, to the CM and the ONU based on the first bandwidth request message sent by the ONU, the bandwidths required for the uplink data from the CM, to avoid a transmission delay caused by requesting bandwidth allocation and interaction a plurality of times in an uplink data transmission process, and the CM transmits the uplink data by using the allocated bandwidth. This helps meet a transmission delay requirement in a service transmission process, and improve bandwidth allocation efficiency.

In another implementation, the bandwidth allocation apparatus may add the first bandwidth grant information and the second bandwidth grant information to the first bandwidth response message. The bandwidth allocation apparatus directly delivers the second bandwidth grant information to the ONU by using the first bandwidth response message. In this way, a procedure of delivering the second bandwidth grant information to the ONU by using the OLT and a message conversion procedure performed by the OLT can be omitted, and the bandwidth configuration efficiency can be further improved.

In Embodiment 1, "first", "second", and "third" are used to distinguish a same type of messages based on names, and the names may be changed based on an actual requirement. For example, a name of the third bandwidth response message in Embodiment 1 may be changed to the second bandwidth response message, and correspondingly, the second bandwidth response message in Embodiment 1 may be changed to the third bandwidth response message.

Embodiment 2

Figure 2B:
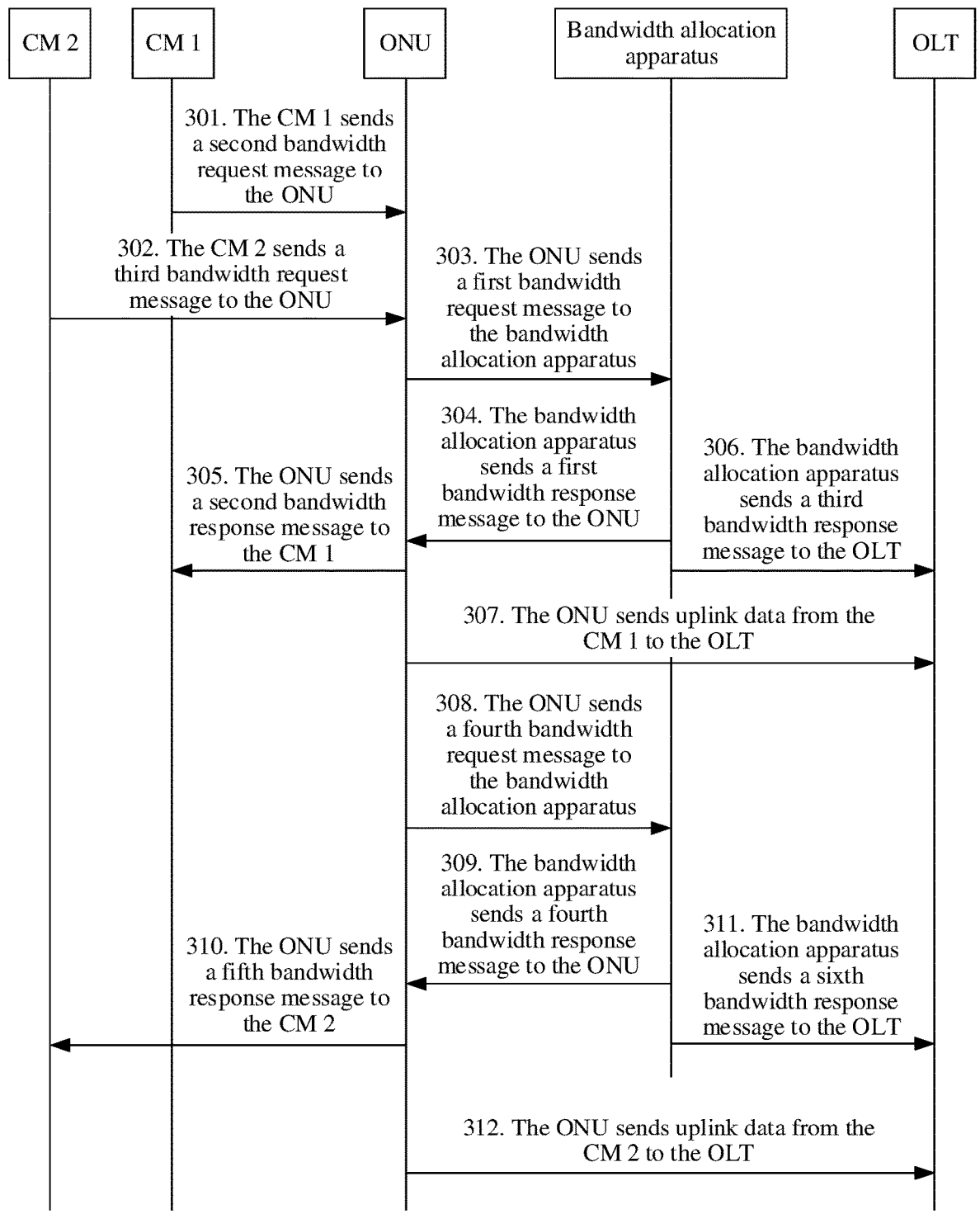
FIG. 2(b) is a flowchart of a bandwidth scheduling method according to Embodiment 2 of this application.

FIG. 2(b) is a flowchart of a bandwidth scheduling method according to Embodiment 2 of this application. In this embodiment, a first user-side device is a CM 1, a second user-side device is a CM 2, a first access device is an OLT, a message conversion apparatus is disposed on a second access device, and the second access device is an ONU. An action related to message conversion and performed by the ONU in Embodiment 2 may be performed by the message conversion apparatus included in the ONU. The following describes the bandwidth scheduling method provided in Embodiment 2 of this application with reference to FIG. 2(b).

301. The CM 1 sends a second bandwidth request message to the ONU.

For example, the CM 1 in Embodiment 2 may be the CM in this embodiment. In addition to the parameters included in the second bandwidth request message in Embodiment 1, the second bandwidth request message may further carry first priority information. The first priority information is used to identify a priority of the CM 1. In this embodiment, the first priority information has a high priority.

Optionally, the first priority information may also be represented by using a service type or a service identifier. For example, a priority of a video service is higher than a priority of an audio service. In other words, the video service has a high priority. If a bandwidth requested by the CM 1 is used to transmit a video service, the first priority information may be determined based on such a type, namely, the video service.

302. The CM 2 sends a third bandwidth request message to the ONU.

For example, the third bandwidth request message includes a second bandwidth requirement and second priority information. The second bandwidth requirement is a bandwidth used for completing transmission of a second service, and the second priority information is used to identify a priority of the second service. In this embodiment, the second priority information has a low priority. To be specific, the priority of the second service is lower than a priority of a first service. A protocol format of the third bandwidth request message may be the same as a protocol format of the second bandwidth request message, or may be different from a protocol format of the second bandwidth request message.

303. The ONU sends a first bandwidth request message to a bandwidth allocation apparatus.

For example, after receiving the second bandwidth request message and the third bandwidth request message, the ONU may place the second bandwidth request message into a high-priority queue and place the third bandwidth request message into a low-priority queue based on the first priority information and the second priority information. After completing a bandwidth request message in the high-priority queue, the ONU completes a bandwidth request message in the low-priority queue.

For example, for a method for generating, by the ONU, the first bandwidth request message based on the second bandwidth request message, refer to corresponding content in step 202 in Embodiment 1. For a method for sending, by the ONU, the first bandwidth request message to the bandwidth allocation apparatus, refer to corresponding content in Embodiment 1.

304. The bandwidth allocation apparatus sends a first bandwidth response message to the ONU.

The method in step 304 is the same as the content in step 203 in Embodiment 1. Details are not described herein again. The first bandwidth response message includes first bandwidth grant information. For the first bandwidth grant information, refer to the first bandwidth grant information in Embodiment 1. To be specific, the CM 1 in Embodiment 2 may be the CM in Embodiment 1, and the first bandwidth grant information is information about a bandwidth that is allocated to the CM 1 and that corresponds to the first service.

For example, if the bandwidth allocation apparatus has a plurality of to-be-processed bandwidth request messages, the bandwidth allocation apparatus may determine, based on priority information included in the bandwidth request messages, for example, the first priority information in the first bandwidth request message, to preferentially process the first bandwidth request message.

305. The ONU sends a second bandwidth response message to the CM 1.

For a method in step 305, refer to corresponding content in step 204 in Embodiment 1. Details are not described herein again.

306. The bandwidth allocation apparatus sends a third bandwidth response message to the OLT.

For a method in step 306, refer to corresponding content in step 205 in Embodiment 1. Details are not described herein again. Step 306 may be performed before, after, or at the same time as step 304. After receiving the third bandwidth response message, the OLT performs protocol format conversion on the third bandwidth response message, to obtain a third bandwidth response message after the protocol format conversion. The third bandwidth response message obtained after the protocol format conversion includes second bandwidth grant information calculated by the bandwidth allocation apparatus. For the second bandwidth grant information, refer to the second bandwidth grant information in Embodiment 1. The second bandwidth grant information is information about a bandwidth that is allocated to the ONU and that corresponds to the first service. A protocol used for the third bandwidth response message obtained after the protocol format conversion is a communication protocol between the OLT and the ONU. The OLT sends, to the ONU, the third bandwidth response message obtained after the protocol format conversion.

307. The ONU sends uplink data from the CM 1 to the OLT.

For a method in step 307, refer to corresponding content in step 206 in Embodiment 1. Details are not described herein again.

308. The ONU sends a fourth bandwidth request message to the bandwidth allocation apparatus.

For example, the ONU obtains the fourth bandwidth request message based on the second bandwidth requirement carried in the third bandwidth request message. The fourth bandwidth request message may be in a format shown in FIG. 3(*a*), and a difference from the first bandwidth request message lies in that a parameter carried in a message body of the fourth bandwidth request message is different from a parameter carried in a message body of the first bandwidth request message. The message body of the fourth bandwidth request message includes the second bandwidth requirement and the second priority information.

309. The bandwidth allocation apparatus sends a fourth bandwidth response message to the ONU.

For example, for a method for obtaining third bandwidth grant information and fourth bandwidth grant information by the bandwidth allocation apparatus, refer to the method for obtaining the first bandwidth grant information and the second bandwidth grant information in step 203 in Embodiment 1. The third bandwidth grant information is information about a bandwidth that is allocated to the CM 2 and that corresponds to the second service. The fourth bandwidth grant information is information about a bandwidth that is allocated to the ONU and that corresponds to the second service. To ensure high efficiency of the OLT and the ONU in a process of processing uplink data, the third bandwidth grant information and the fourth bandwidth grant information include parameters of a same type.

For example, the third bandwidth grant information includes at least one of third time information and third frequency information. The third time information includes a start point of a third time slice and a length of the third time slice, and the third frequency information includes a center frequency of a third frequency band and a frequency width of the third frequency band. The start point of the third time slice is a start moment at which the CM 2 sends the second service, the length of the third time slice is effective duration in which the CM 2 sends the second service, and the third frequency band is a frequency range within which the CM 2 sends the second service.

For example, the fourth bandwidth grant information includes at least one of fourth time information and fourth frequency information. The fourth time information includes a start point of a fourth time slice and a length of the fourth time slice, and the fourth frequency information includes a center frequency of a fourth frequency band and a frequency width of the fourth frequency band. The start point of the fourth time slice is a start moment at which the ONU sends the second service, the length of the fourth time slice is effective duration in which the ONU sends the second service, and the fourth frequency band is a frequency range within which the ONU sends the second service.

For example, the fourth bandwidth response message is also in a format shown in FIG. 3(*b*). A difference from the first bandwidth response message lies in that a parameter included in a message body of the fourth bandwidth response message is different from a parameter included in a message body in FIG. 3(*b*). To be specific, the fourth bandwidth response message includes the third bandwidth grant information.

310. The ONU sends a fifth bandwidth response message to the CM 2.

For example, for a method in step 310, refer to the method in step 204 in Embodiment 1. A difference from that in Embodiment 1 in that the fifth bandwidth response message carries the third bandwidth grant information. The fifth bandwidth response message is a message obtained after protocol format conversion is performed on the fourth bandwidth response message.

311. The bandwidth allocation apparatus sends a sixth bandwidth response message to the OLT.

For example, the sixth bandwidth response message includes the fourth bandwidth grant information. For a method in step 311, refer to corresponding content in step 205 in Embodiment 1. Details are not described herein again. Step 311 may be performed before step 309, or step 311 may be performed at the same time as step 309. Examples are not described one by one herein. The OLT may use the method in Embodiment 1 to obtain a sixth bandwidth response message after protocol format conversion, and send the fourth bandwidth grant information to the ONU by using the sixth bandwidth response message obtained after the protocol format conversion.

312. The ONU sends the uplink data from the CM 2 to the OLT.

For example, the CM 2 may complete bandwidth configuration for the CM 2 itself based on the third bandwidth grant information, and the ONU may complete bandwidth configuration for the ONU itself based on the fourth bandwidth grant information. The CM 2 may send the uplink data of the second service to the ONU by using a configured bandwidth. The ONU may send the uplink data of the second service to the OLT by using a configured bandwidth. The OLT may directly forward the uplink data that is of the second service and that is from the ONU. In this way, when the uplink data is sent to the OLT, there is no need to wait for a procedure in which the OLT applies for bandwidth allocation. This helps reduce a transmission delay and improve bandwidth allocation efficiency.

According to the bandwidth scheduling method provided in this embodiment of this application, the ONU may preferentially process a bandwidth request message with a high priority based on priority information carried in bandwidth request messages from the CM 1 and the CM 2. In this way, a bandwidth of a high-priority service is preferentially configured. This helps reduce a transmission delay of the high-priority service.

In another implementation, the message conversion apparatus may be disposed on another second access device, and the another second access device may be a CMTS, a CCAP, an AP, or a BS.

In Embodiment 2, "first", "second", and "third" are used to distinguish a same type of messages based on names, and the names may be changed based on an actual requirement. For example, a name of the third bandwidth response message in Embodiment 2 may be changed to the second bandwidth response message, and correspondingly, the second bandwidth response message in Embodiment 2 may be changed to the third bandwidth response message.

Figure 4A:
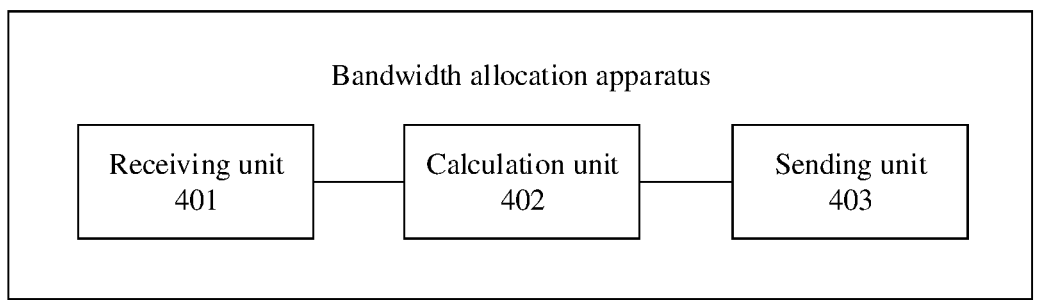
FIG. 4(a) is a schematic structural diagram of a bandwidth allocation apparatus according to an embodiment of this application.

FIG. 4(a) is a schematic structural diagram of a bandwidth allocation apparatus according to an embodiment of this application. The bandwidth allocation apparatus in this embodiment may be the bandwidth allocation apparatus in the embodiment in FIG. 2(a) or FIG. 2(b). The following describes the bandwidth allocation apparatus in this embodiment of this application with reference to FIG. 4(a).

The bandwidth allocation apparatus provided in this embodiment includes a receiving unit 401, a calculation unit 402, and a sending unit 403.

The receiving unit 401 is configured to receive a bandwidth request message sent by a message conversion apparatus, where the bandwidth request message includes a bandwidth requirement, and the bandwidth requirement is a bandwidth used for completing transmission of a service.

The calculation unit 402 is configured to calculate first bandwidth grant information and second bandwidth grant information based on the bandwidth requirement, where the first bandwidth grant information is information about a bandwidth that is allocated to a user-side device and that corresponds to the service, and the second bandwidth grant information is information about a bandwidth that is allocated to a second access device and that corresponds to the service.

The sending unit 403 is configured to send a first bandwidth response message to the message conversion apparatus, and send a second bandwidth response message to a first access device, where the first bandwidth response message includes the first bandwidth grant information, and the second bandwidth response message includes the second bandwidth grant information.

For example, the bandwidth request message further includes at least one of a service identifier and priority information, the priority information is used to identify a priority of the service, and the service identifier is used to identify the service.

Figure 4B:
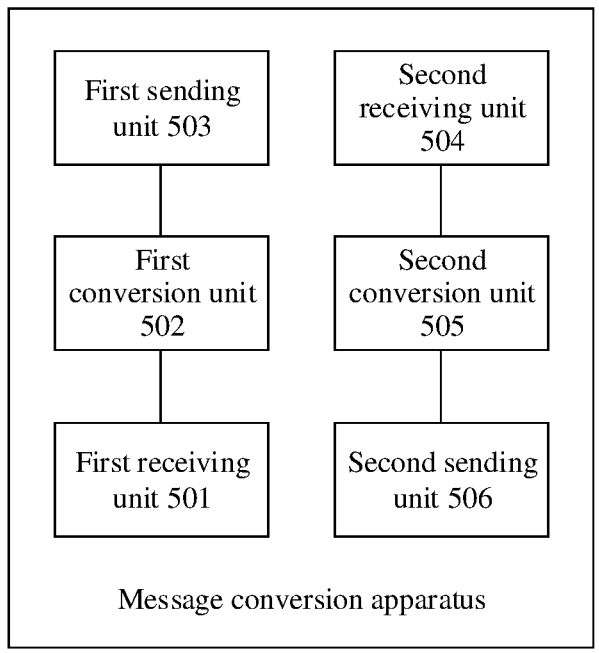
FIG. 4(b) is a schematic structural diagram of a message conversion apparatus according to an embodiment of this application.

FIG. 4(b) is a schematic structural diagram of a message conversion apparatus according to an embodiment of this application. The message conversion apparatus in this embodiment may be disposed on the ONU in the embodiment in FIG. 2(a) or FIG. 2(b). The message conversion apparatus in FIG. 4(b) may perform specific configuration based on a protocol type used by a second access device on which the message conversion apparatus is disposed, so that a bandwidth request from a user-side device is rapidly and efficiently sent to a bandwidth allocation apparatus. The following describes the message conversion apparatus in this embodiment of this application with reference to FIG. 4(b).

The message conversion apparatus provided in this embodiment of this application includes a first receiving unit 501, a first conversion unit 502, a first sending unit 503, a second receiving unit 504, a second conversion unit 505, and a second sending unit 506.

The first receiving unit 501 is configured to receive a second bandwidth request message sent by the user-side device, where the second bandwidth request message includes a first bandwidth requirement, and the first bandwidth requirement is a bandwidth used for completing transmission of a first service.

The first conversion unit 502 is configured to obtain a first bandwidth request message based on the second bandwidth request message, where the first bandwidth request message includes the first bandwidth requirement.

The first sending unit 503 is configured to send the first bandwidth request message to the bandwidth allocation apparatus.

The second receiving unit 504 is configured to receive a first bandwidth response message sent by the bandwidth allocation apparatus, where the first bandwidth response message includes first bandwidth grant information, and the first bandwidth grant information is information about a bandwidth that is allocated to the user-side device and that corresponds to the first service.

The second conversion unit 505 is configured to obtain a second bandwidth response message based on the first bandwidth response message, where the second bandwidth response message includes the first bandwidth grant information. Specifically, the second conversion unit 505 is configured to perform protocol format conversion on the first bandwidth response message, to obtain the second bandwidth response message.

The second sending unit 506 is configured to send the second bandwidth response message to the user-side device. The second sending unit 506 and the second conversion unit 505 may be disposed on one physical component.

For example, the first bandwidth request message further includes at least one of a first service identifier and first priority information. The first priority information is used to identify a priority of a first service, and the first service identifier is used to identify the first service.

For example, the first bandwidth request message and the first bandwidth response message are based on a same protocol, and the first bandwidth request message is based on an internet protocol IP or an Ethernet protocol.

The second bandwidth request message and the first bandwidth request message are based on different protocols, and the second bandwidth response message and the second bandwidth request message are based on a same protocol.

In an implementation, the first bandwidth response message further includes second bandwidth grant information, and the second bandwidth grant information is information about a bandwidth that is allocated to the user-side device and that corresponds to a second service. The first receiving unit 501 is further configured to receive a second bandwidth requirement sent by the user-side device, where the second bandwidth requirement is a bandwidth used for completing transmission of the second service. The first conversion unit 502 is further configured to add the second bandwidth requirement to the first bandwidth request message. The second conversion unit 505 is further configured to obtain the second bandwidth grant information from the first bandwidth response message. The second sending unit 506 is further configured to send the second bandwidth grant information to the user-side device.

Figure 4C:
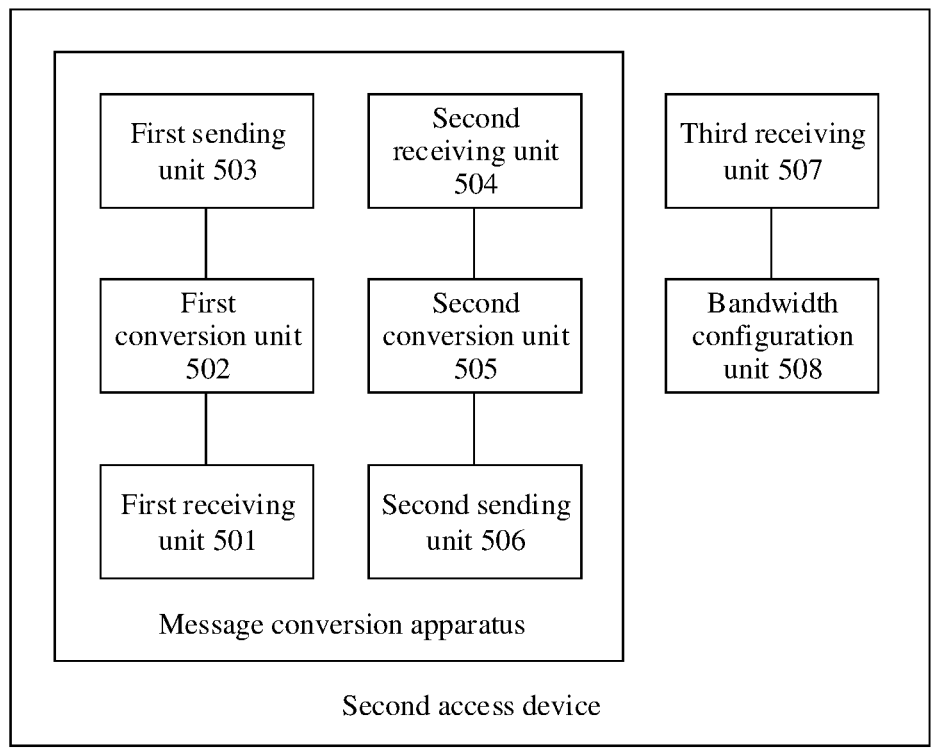
FIG. 4(c) is a schematic structural diagram of a second access device according to an embodiment of this application.

FIG. 4(c) is a schematic structural diagram of a second access device according to an embodiment of this application. The second access device provided in this embodiment of this application may include the message conversion apparatus shown in FIG. 4(b). The second access device further includes a third receiving unit 507 and a bandwidth configuration unit 508. The third receiving unit 507 is configured to receive a third bandwidth response message sent by the first receiving device. The third bandwidth response message includes third bandwidth grant information, and the third bandwidth grant information is information about a bandwidth that is allocated to the second access device and that corresponds to the first service. The bandwidth configuration unit 508 is configured to complete bandwidth configuration based on the third bandwidth grant information. For the third bandwidth grant information, refer to the second bandwidth grant information in the embodiment corresponding to FIG. 2(*a*).

An embodiment of this application further provides a first access device. The first access device includes a receiving unit, a conversion unit, and a sending unit. The receiving unit is configured to receive a first bandwidth response message sent by a bandwidth allocation apparatus, where the first bandwidth response message includes bandwidth grant information, and the bandwidth grant information is information about a bandwidth that is allocated to a second access device and that corresponds to a service. The conversion unit is configured to perform protocol format conversion on the first bandwidth response message, to obtain a second bandwidth response message, where the second bandwidth response message includes the bandwidth grant information. The sending unit is configured to send the second bandwidth response message to the second access device. For the bandwidth grant information, refer to the second bandwidth grant information in the embodiment corresponding to FIG. 2(*a*).

For example, the first bandwidth response message and the second bandwidth response message are based on different protocols, where the first bandwidth response message may be an IP-based message, and the second bandwidth response message may be a PON-based message.

Figure 5A:
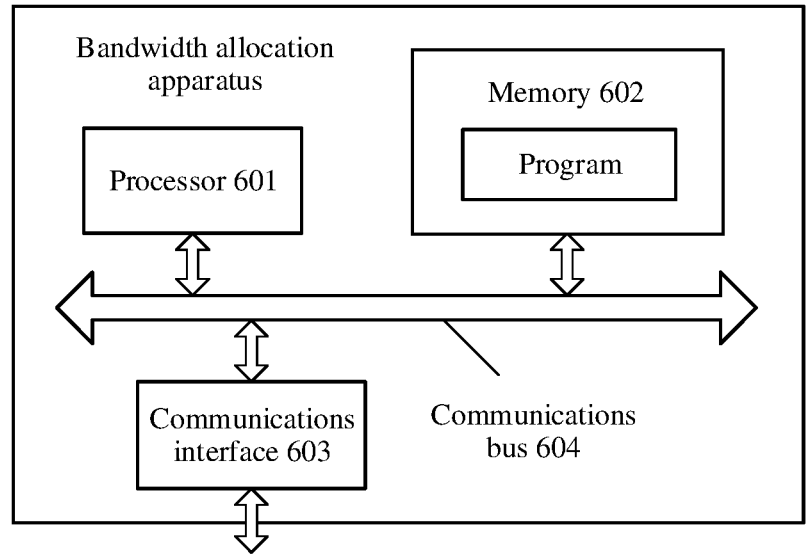
FIG. 5(a) is a schematic structural diagram of a bandwidth allocation apparatus according to an embodiment of this application.
Figure 5B:
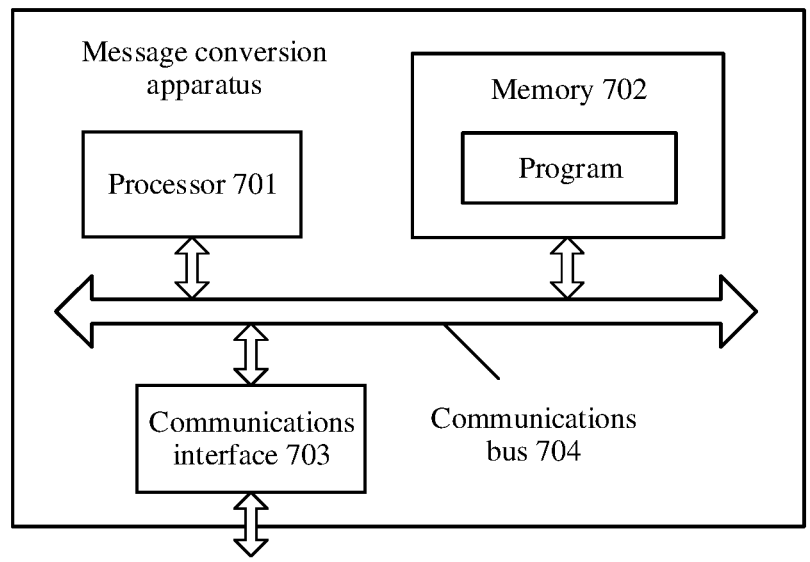
FIG. 5(b) is a schematic structural diagram of a message conversion apparatus according to an embodiment of this application.

FIG. 5(*a*) is a schematic structural diagram of a bandwidth allocation apparatus according to an embodiment of this application. The bandwidth allocation apparatus in this embodiment may be the bandwidth allocation apparatus in the embodiment in FIG. 2(*a*), FIG. 2(*b*), or FIG. 4(*a*). In this embodiment, a structure of the bandwidth allocation apparatus is described from a perspective of a hardware implementation. The bandwidth allocation apparatus in this embodiment includes a processor 601, a memory 602, and a communications interface 603. The processor 601, the memory 602, and the communications interface 603 are connected by using a communications bus 604. The memory 602 is configured to store a program. The processor 601 performs, according to an executable instruction included in the program read from the memory 602, the method steps performed by the bandwidth allocation apparatus in Embodiment 1 or Embodiment 2. The processor 601 may receive and send a bandwidth request message and a bandwidth response message through the communications interface 603.

FIG. 5(*b*) is a schematic structural diagram of a message conversion apparatus according to an embodiment of this application. The message conversion apparatus in this embodiment may be disposed on the ONU in the embodiment in FIG. 2(*a*) or FIG. 2(*b*). The message conversion apparatus in this embodiment may be the message conversion apparatus in FIG. 4(*b*). In this embodiment, a structure of the message conversion apparatus is described from a perspective of a hardware implementation. The message conversion apparatus in this embodiment includes a processor 701, a memory 702, and a communications interface 703. The processor 701, the memory 702, and the communications interface 703 are connected by using a communications bus 704. The memory 702 is configured to store a program. The processor 701 performs, according to an executable instruction included in the program read from the memory 702, the method steps performed by the ONU in Embodiment 1 or Embodiment 2. The processor 701 may receive and send a bandwidth request message and a bandwidth response message through the communications interface 703.

An embodiment of this application further provides a second access device. The access device may include the message conversion apparatus provided in the embodiment corresponding to FIG. 5(*b*). In this embodiment, a component that is used by the second access device to receive a bandwidth response message from a first access device may be the communications interface 703 in FIG. 5(*b*). The second access device may use the processor 701 in FIG. 5(*b*) to perform bandwidth configuration, that is, to complete the bandwidth configuration based on bandwidth grant information in the bandwidth response message from the first access device. Alternatively, the second access device may use an interface different from the communications interface 703 to receive the bandwidth response message from the first access device. The second access device may use a processor different from the processor 701 to perform the bandwidth configuration. Examples are not described one by one herein.

FIG. 6(*a*) is a schematic structural diagram of a bandwidth scheduling system according to an embodiment of this application. The bandwidth scheduling system provided in this embodiment may include the bandwidth allocation apparatus shown in FIG. 4(*a*) and the message conversion apparatus shown in FIG. 4(*b*). For specific content of the bandwidth allocation apparatus and the message conversion apparatus, refer to related content in FIG. 4(*a*) and FIG. 4(*b*). Details are not described herein again. In another implementation, the bandwidth scheduling system provided in this embodiment of this application may further include the bandwidth allocation apparatus in FIG. 5(*a*) and the message conversion apparatus in FIG. 5(*b*). Details of the foregoing two devices are not described herein again.

FIG. 6(*b*) is a schematic structural diagram of a bandwidth scheduling system according to an embodiment of this application. In the bandwidth scheduling system shown in FIG. 6(*b*), a cable (cable) device conversion module may be a message conversion apparatus disposed on an access device in a fixed network, a PON device conversion module may be a message conversion module disposed on an access device in a PON network, and a wireless device conversion module may be a message conversion module disposed on an access device in a wireless network.

The cable device conversion module is used as an example. The cable device conversion module includes a data over cable service interface specification (DOCSIS) bandwidth request receiving module, a high-priority queue, a low-priority queue, a bandwidth request message conversion module, a grant message conversion module, and a DOCSIS grant sending module. The DOCSIS bandwidth request receiving module included in the cable device conversion module receives a DOCSIS request message from a user-side device, where the message may be represented as a DOCSIS Req. message, and the message may be a MAC frame. For a parameter carried in the DOCSIS request message, refer to the second bandwidth request message in FIG. 2(*a*) or FIG. 2(*b*). The DOCSIS bandwidth request receiving module included in the cable device conversion module may place the DOCSIS Req. message into the high-priority queue or the low-priority queue based on priority information carried in the DOCSIS Req. message. The bandwidth request message conversion module in the cable device conversion module preferentially reads a message in the high-priority queue, and then reads a message in the low-priority queue after the high-priority queue becomes empty. The bandwidth request message conversion module in the cable device conversion module performs format conversion on a read message, and converts the read message into an IP-based bandwidth request message, where the message may be specifically represented as BW Req. over IP. The bandwidth request message conversion module in the cable device conversion module sends the IP-based bandwidth request message to a bandwidth allocation apparatus. For a parameter carried in the IP-based bandwidth request message, refer to the first bandwidth request message in FIG. 2(a) or FIG. 2(b). The grant message conversion module in the cable device conversion module receives an IP-based bandwidth authorization message from the bandwidth allocation apparatus, where the message may be specifically represented as BW Grant over IP. For a parameter carried in the message, refer to the first bandwidth response message in FIG. 2(a) or FIG. 2(b). The grant message conversion module in the cable device conversion module converts the IP-based bandwidth grant message into a bandwidth grant message, where the message may be specifically represented as a DOCSIS grant message and the message is a MAC frame, and sends the DOCSIS grant message to the DOCSIS grant sending module. The DOCSIS grant sending module sends the DOCSIS grant message to the user-side device. For a parameter carried in the bandwidth grant message, refer to the second bandwidth response message in FIG. 2(a) or FIG. 2(b).

The PON device conversion module is used as an example. The PON device conversion module includes a PON bandwidth request receiving module, a high-priority queue, a low-priority queue, a bandwidth request message conversion module, a grant message conversion module, and a PON grant sending module. The PON bandwidth request receiving module included in the PON device conversion module receives a PON request message from a user-side device, where the message may be represented as a PON Req. message, and the message may be a MAC frame. For a parameter carried in the PON request message, refer to the second bandwidth request message in FIG. 2(a) or FIG. 2(b). The PON bandwidth request receiving module included in the PON device conversion module may place the PON Req. message into the high-priority queue or the low-priority queue based on priority information carried in the PON Req. message. The bandwidth request message conversion module in the PON device conversion module preferentially reads a message in the high-priority queue, and then reads a message in the low-priority queue after the high-priority queue becomes empty. The bandwidth request message conversion module in the PON device conversion module performs format conversion on a read message, and converts the read message into an IP-based bandwidth request message, where the message may be specifically represented as BW Req. over IP. The bandwidth request message conversion module in the PON device conversion module sends the IP-based bandwidth request message to a bandwidth allocation apparatus. For a parameter carried in the IP-based bandwidth request message, refer to the first bandwidth request message in FIG. 2(a) or FIG. 2(b). The grant message conversion module in the PON device conversion module receives an IP-based bandwidth authorization message from the bandwidth allocation apparatus, where the message may be specifically represented as BW Grant over IP. For a parameter carried in the message, refer to the first bandwidth response message in FIG. 2(a) or FIG. 2(b). The grant message conversion module in the PON device conversion module converts the IP-based bandwidth grant message into a bandwidth grant message, where the message may be specifically represented as a PON grant message and the message is a MAC frame, and sends the PON grant message to the PON grant sending module. The PON grant sending module sends the PON grant message to the user-side device. For a parameter carried in the bandwidth grant message, refer to the second bandwidth response message in FIG. 2(a) or FIG. 2(b).

The wireless device conversion module is used as an example. The wireless device conversion module includes a wireless bandwidth request receiving module, a high-priority queue, a low-priority queue, a bandwidth request message conversion module, a grant message conversion module, and a wireless grant sending module. The wireless bandwidth request receiving module included in the wireless device conversion module receives a wireless request message from a user-side device, where the message may be represented as a wireless Req. message, and the message may be a MAC frame. For a parameter carried in the wireless request message, refer to the second bandwidth request message in FIG. 2(a) or FIG. 2(b). The wireless bandwidth request receiving module included in the wireless device conversion module may place the wireless Req. message into the high-priority queue or the low-priority queue based on priority information carried in the wireless Req. message. The bandwidth request message conversion module in the wireless device conversion module preferentially reads a message in the high-priority queue, and then reads a message in the low-priority queue after the high-priority queue becomes empty. The bandwidth request message conversion module in the wireless device conversion module performs format conversion on a read message, and converts the read message into an IP-based bandwidth request message, where the message may be specifically represented as BW Req. over IP. The bandwidth request message conversion module in the wireless device conversion module sends the IP-based bandwidth request message to a bandwidth allocation apparatus. For a parameter carried in the IP-based bandwidth request message, refer to the first bandwidth request message in FIG. 2(a) or FIG. 2(b). The grant message conversion module in the wireless device conversion module receives an IP-based bandwidth authorization message from the bandwidth allocation apparatus, where the message may be specifically represented as BW Grant over IP. For a parameter carried in the message, refer to the first bandwidth response message in FIG. 2(a) or FIG. 2(b). The grant message conversion module in the wireless device conversion module converts the IP-based bandwidth grant message into a bandwidth grant message, where the message may be specifically represented as a wireless grant message and the message is a MAC frame, and sends the wireless grant message to the wireless grant sending module. The wireless grant sending module sends the wireless grant message to the user-side device. For a parameter carried in the bandwidth grant message, refer to the second bandwidth response message in FIG. 2(a) or FIG. 2(b).

Figure 6A:
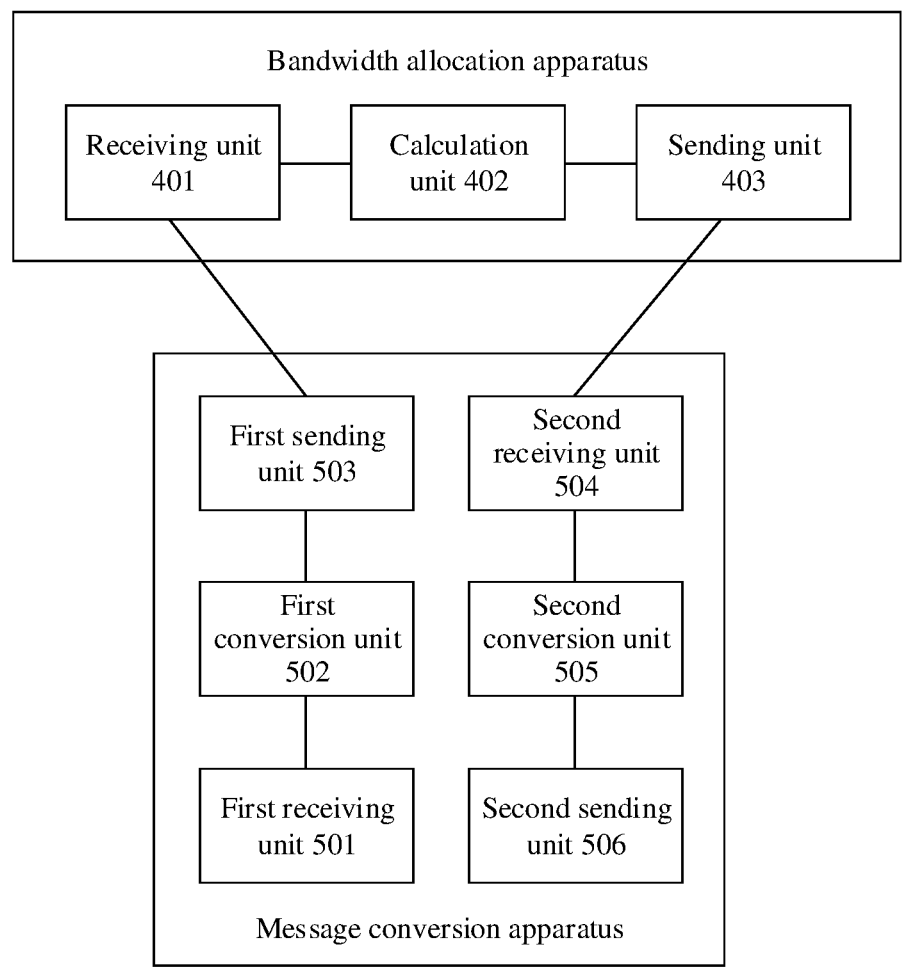
FIG. 6(a) is a schematic structural diagram of a bandwidth scheduling system according to an embodiment of this application.
Figure 6B:
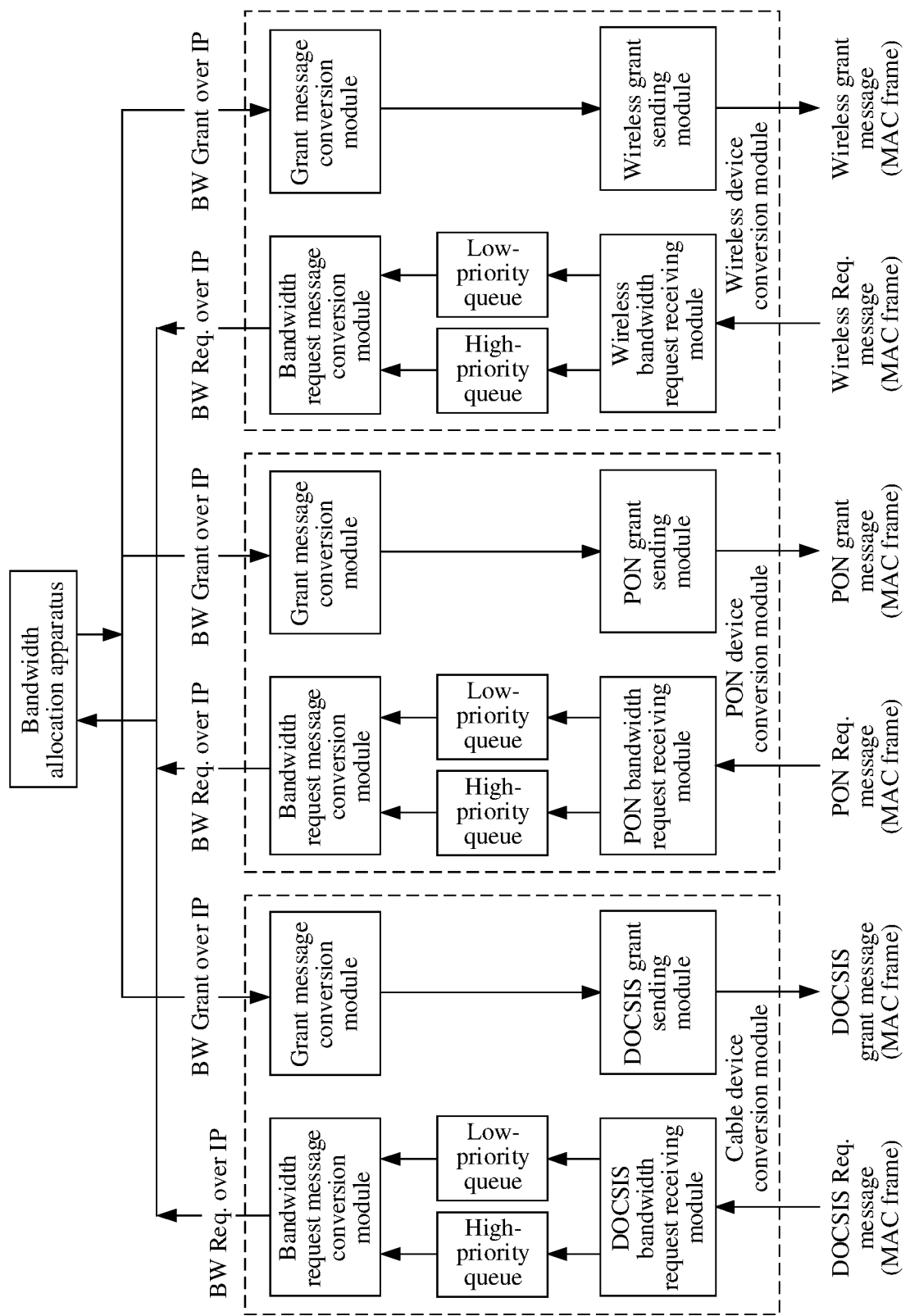
FIG. 6(b) is a schematic structural diagram of a bandwidth scheduling system according to an embodiment of this application.
Figure 6C:
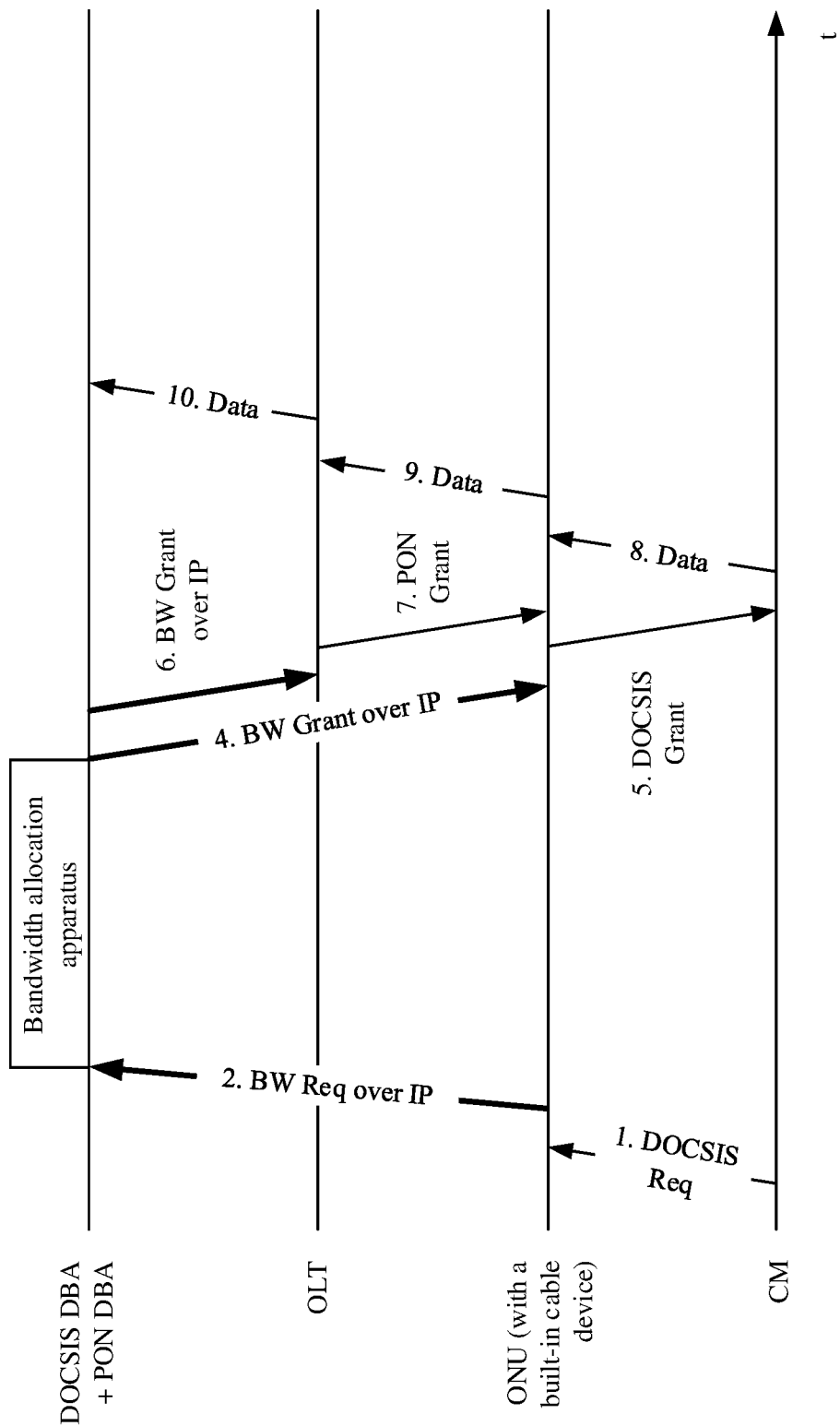
FIG. 6(c) is a schematic diagram of a scenario of a bandwidth scheduling method according to an embodiment of this application.

FIG. 6(c) is a schematic diagram of a scenario of a bandwidth scheduling method according to an embodiment of this application. In the scenario shown in FIG. 6(c), a bandwidth allocation apparatus may be the bandwidth allocation apparatus in FIG. 2(a) or FIG. 2(b). DOCSIS Req may be the second bandwidth request message in FIG. 2(a) or FIG. 2(b). BW Req over IP may be the first bandwidth request message in FIG. 2(a) or FIG. 2(b). BW Grant over IP sent by the bandwidth allocation apparatus to an ONU may be the first bandwidth response message in FIG. 2(a) or FIG. 2(b). BW Grant over IP sent by the bandwidth allocation apparatus to an OLT may be the third bandwidth response message in FIG. 2(a) or FIG. 2(b). PON Grant sent by the OLT to the ONU may be the fourth bandwidth response message in Embodiment 1, or the third bandwidth response message obtained after the protocol format conversion in Embodiment 2. DOCSIS Grant may be the second bandwidth response message in FIG. 2(a) or FIG. 2(b). In FIG. 6(c), the ONU has a built-in cable device.

Figure 6D:
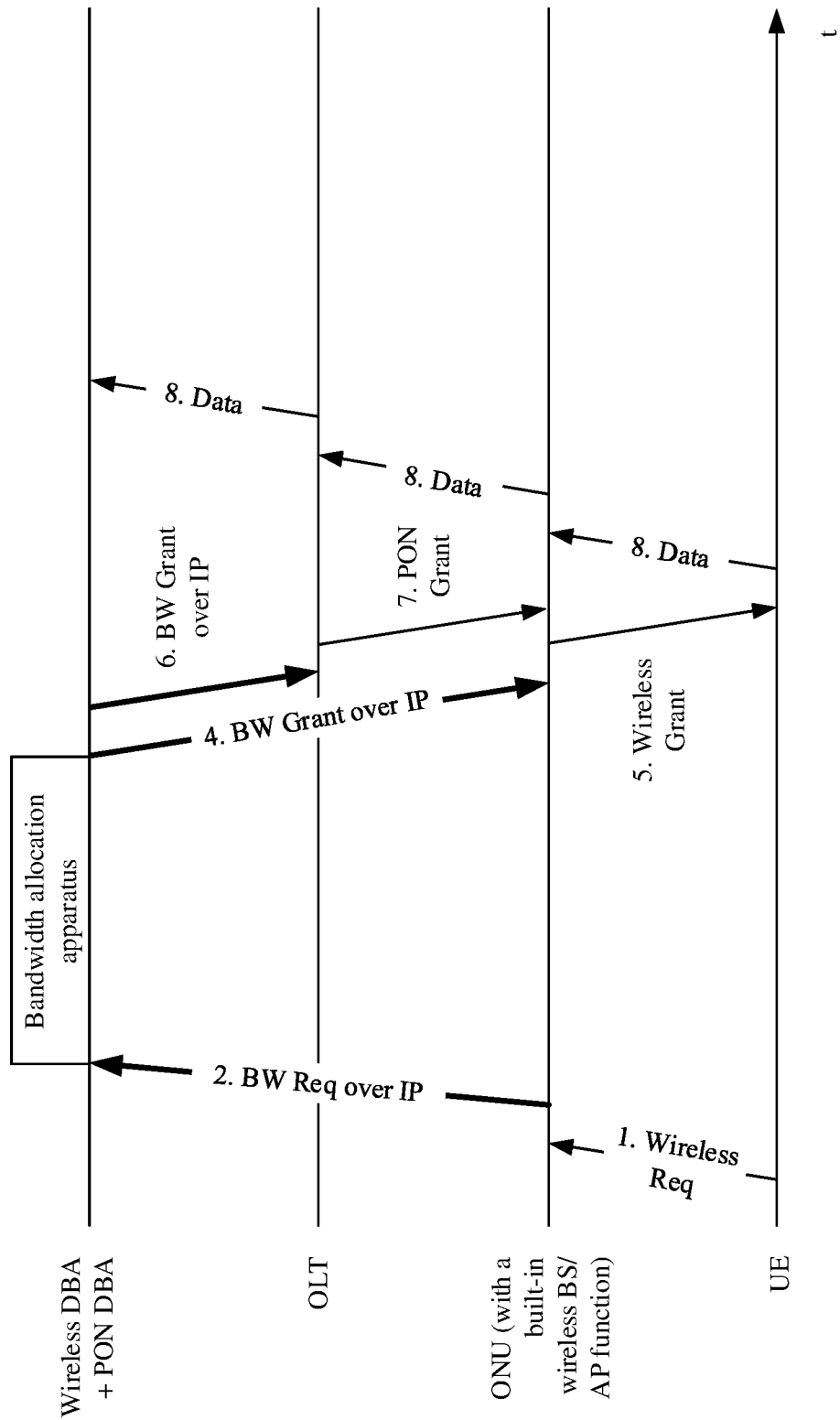
FIG. 6(d) is a schematic diagram of another scenario of a bandwidth scheduling method according to an embodiment of this application.

FIG. 6(d) is a schematic diagram of another scenario of a bandwidth scheduling method according to an embodiment of this application. In the scenario shown in FIG. 6(c), a bandwidth allocation apparatus may be the bandwidth allocation apparatus in FIG. 2(a) or FIG. 2(b). Wireless Req may be the second bandwidth request message in FIG. 2(a) or FIG. 2(b). BW Req over IP may be the first bandwidth request message in FIG. 2(a) or FIG. 2(b). BW Grant over IP sent by the bandwidth allocation apparatus to an ONU may be the first bandwidth response message in FIG. 2(a) or FIG. 2(b). BW Grant over IP sent by the bandwidth allocation apparatus to an OLT may be the third bandwidth response message in FIG. 2(a) or FIG. 2(b). PON Grant sent by the OLT to the ONU may be the fourth bandwidth response message in Embodiment 1, or the third bandwidth response message obtained after the protocol format conversion in Embodiment 2. Wireless Grant may be the second bandwidth response message in FIG. 2(a) or FIG. 2(b). The ONU in FIG. 6 (d) has a built-in wireless AP or BS function.

In another implementation, a message conversion apparatus provided in an embodiment of this application may be disposed outside a second access device, and receives and sends of a bandwidth request message and a bandwidth response message by using a protocol between the message conversion apparatus and the second access device.

The general purpose processor mentioned in the embodiment of this application may be a microprocessor or the processor may be any conventional processor. The steps in the methods disclosed with reference to the embodiments of the present invention may be directly performed by using a combination of hardware in the processor and a software module. When it is implemented by using software, code that implements the foregoing functions may be stored in a computer-readable medium. The computer-readable medium includes a computer storage medium. The storage medium may be any available medium accessible to a computer. The following is taken as an example but is not limited. The computer-readable medium may be a random access memory (RAM), a read-only memory (ROM), an electrically erasable programmable read-only memory (EEPROM), a compact disc read-only memory (CD-ROM) or other optical disc storage, a disc storage medium or other disc storage, or any other medium that can be used to carry or store expected program code in a command or data structure form and can be accessed by a computer. The computer-readable medium may be a compact disc (CD), a laser disc, a digital video disc (DVD), a floppy disc, or a Blu-ray disc.

It should be noted that the embodiments in this specification are all described in a progressive manner, each embodiment focuses on a difference from other embodiments, and for same or similar parts in the embodiments, refer to these embodiments. An apparatus embodiment is basically similar to a method embodiment, and therefore is described briefly. For related parts, refer to partial descriptions in the method embodiment.

The embodiments disclosed above are described to enable a technical person skilled in the art to implement or use the present invention. Various modifications to the embodiments are obvious to the technical person skilled in the art, and general principles defined in this specification may be implemented in other embodiments without departing from the scope of the present invention. Therefore, the present invention will not be limited to the embodiments described in this specification but extends to the widest scope that complies with the principles and novelty disclosed in this specification.

What is claimed is:

1. A bandwidth scheduling method, comprising:
receiving, by a bandwidth allocation apparatus, a bandwidth request message sent by a message conversion apparatus, wherein the bandwidth request message comprises a bandwidth requirement, and wherein the bandwidth requirement is a bandwidth used for completing transmission of a service;
calculating, by the bandwidth allocation apparatus, first bandwidth grant information and second bandwidth grant information according to the bandwidth requirement, wherein the first bandwidth grant information is information about a bandwidth that is allocated to a user-side device and that corresponds to the service, and wherein the second bandwidth grant information is information about a bandwidth that is allocated to a second access device and that corresponds to the service; and
sending, by the bandwidth allocation apparatus, a first bandwidth response message to the message conversion apparatus, and sending a second bandwidth response message to a first access device, wherein the first bandwidth response message comprises the first bandwidth grant information, and wherein the second bandwidth response message comprises the second bandwidth grant information.

2. The method according to claim 1, wherein the first bandwidth grant information comprises at least one of first time information and first frequency information, wherein the first time information comprises a start point of a first time slice and a length of the first time slice, wherein the first frequency information comprises a center frequency of a first frequency band and a frequency width of the first frequency band, wherein the start point of the first time slice is a start moment at which the user-side device sends the service, wherein the length of the first time slice is an effective duration in which the user-side device sends the service, and wherein the first frequency band is a frequency range within which the user-side device sends the service.

3. The method according to claim 1, wherein the second bandwidth grant information comprises at least one of second time information and second frequency information, wherein the second time information comprises a start point of a second time slice and a length of the second time slice, wherein the second frequency information comprises a center frequency of a second frequency band and a frequency width of the second frequency band, wherein the start point of the second time slice is a start moment at which the second access device sends the service, wherein the length of the second time slice is an effective duration in which the second access device sends the service, and wherein the second frequency band is a frequency range within which the second access device sends the service.

4. The method according to claim 1, wherein the bandwidth request message further comprises at least one of a service identifier and priority information, wherein the priority information identifies a priority of the service, and wherein the service identifier identifies the service.

5. The method according to claim 1, wherein the first bandwidth response message and the second bandwidth response message are Internet Protocol (IP)-based messages.

6. The method according to claim 1, wherein the first bandwidth response message and the second bandwidth response message are Ethernet encapsulation messages.

7. A bandwidth scheduling method, comprising:
receiving, by a message conversion apparatus, a second bandwidth request message sent by a user-side device, wherein the second bandwidth request message comprises a first bandwidth requirement, and the first bandwidth requirement is a bandwidth used for completing transmission of a first service;
obtaining, by the message conversion apparatus, a first bandwidth request message according to the second bandwidth request message, wherein the first bandwidth request message comprises the first bandwidth requirement;
sending, by the message conversion apparatus, the first bandwidth request message to a bandwidth allocation apparatus;
receiving, by the message conversion apparatus, a first bandwidth response message sent by the bandwidth allocation apparatus, wherein the first bandwidth response message comprises first bandwidth grant information, and wherein the first bandwidth grant information is information about a bandwidth that is allocated to the user-side device and that corresponds to the first service;
obtaining, by the message conversion apparatus, a second bandwidth response message according to the first bandwidth response message, wherein the second bandwidth response message comprises the first bandwidth grant information; and
sending, by the message conversion apparatus, the second bandwidth response message to the user-side device.

8. The method according to claim 7, wherein the first bandwidth grant information comprises at least one of first time information or first frequency information, wherein the first time information comprises a start point of a first time slice and a length of the first time slice, wherein the first frequency information comprises a center frequency of a first frequency band and a frequency width of the first frequency band, wherein the start point of the first time slice is a start moment at which the user-side device sends the first service, wherein the length of the first time slice is an effective duration in which the user-side device sends the first service, and wherein the first frequency band is a frequency range within which the user-side device sends the first service.

9. The method according to claim 7, wherein the first bandwidth request message further comprises at least one of a first service identifier or first priority information, wherein the first priority information identifies a priority of a first service, and wherein the first service identifier identifies the first service.

10. The method according to claim 7, wherein the first bandwidth request message and the first bandwidth response message are based on a same protocol, and wherein the first bandwidth request message is based on an internet protocol (IP) or an Ethernet protocol; and
wherein the second bandwidth request message and the first bandwidth request message are based on different protocols, and wherein the second bandwidth response message and the second bandwidth request message are based on a same protocol.

11. The method according to claim 7, wherein the first bandwidth response message further comprises second bandwidth grant information, wherein the second bandwidth grant information is information about a bandwidth that is allocated to the user-side device and that corresponds to a second service; and
wherein the method further comprises:
receiving, by the message conversion apparatus, a second bandwidth requirement sent by the user-side device, wherein the second bandwidth requirement is a bandwidth used for completing transmission of the second service;
adding, by the message conversion apparatus, the second bandwidth requirement to the first bandwidth request message;
obtaining, by the message conversion apparatus, the second bandwidth grant information from the first bandwidth response message; and
sending, by the message conversion apparatus, the second bandwidth grant information to the user-side device.

12. A bandwidth allocation apparatus, comprising:
a processor; and
a non-transitory computer-readable storage medium coupled to the processor and storing programming instructions for execution by the processor, the programming instructions instructing the processor to:
receive a bandwidth request message sent by a message conversion apparatus, wherein the bandwidth request message comprises a bandwidth requirement, and wherein the bandwidth requirement is a bandwidth used for completing transmission of a service;
calculate first bandwidth grant information and second bandwidth grant information according to the bandwidth requirement, wherein the first bandwidth grant information is information about a bandwidth that is allocated to a user-side device and that corresponds to the service, and wherein the second bandwidth grant information is information about a bandwidth that is allocated to a second access device and that corresponds to the service; and
send a first bandwidth response message to the message conversion apparatus, and send a second bandwidth response message to a first access device, wherein the first bandwidth response message comprises the first bandwidth grant information, and wherein the second bandwidth response message comprises the second bandwidth grant information.

13. The apparatus according to claim 12, wherein the bandwidth request message further comprises at least one of a service identifier and priority information, wherein the priority information is used to identify identifies a priority of the service, and wherein the service identifier is used to identify identifies the service.

14. The bandwidth allocation apparatus according to claim 12, wherein the first bandwidth grant information comprises at least one of first time information and first frequency information, wherein the first time information comprises a start point of a first time slice and a length of the first time slice, wherein the first frequency information comprises a center frequency of a first frequency band and a frequency width of the first frequency band, wherein the start point of the first time slice is a start moment at which the user-side device sends the service, wherein the length of the first time slice is an effective duration in which the user-side device sends the service, and wherein the first frequency band is a frequency range within which the user-side device sends the service.

15. The bandwidth allocation apparatus according to claim 12, wherein the second bandwidth grant information comprises at least one of second time information and second frequency information, wherein the second time information comprises a start point of a second time slice and a length of the second time slice, wherein the second frequency information comprises a center frequency of a second frequency band and a frequency width of the second frequency band, wherein the start point of the second time slice is a start moment at which the second access device sends the service, wherein the length of the second time slice is an effective duration in which the second access device sends the service, and wherein the second frequency band is a frequency range within which the second access device sends the service.

16. The bandwidth allocation apparatus according to claim 12, wherein the first bandwidth response message and the second bandwidth response message are one of Internet Protocol (IP)-based messages or Ethernet encapsulation messages.

17. A message conversion apparatus, comprising:
a processor; and
a non-transitory computer-readable storage medium coupled to the processor and storing programming instructions for execution by the processor, the programming instructions instruct the processor to:
  receive a second bandwidth request message sent by a user-side device, wherein the second bandwidth request message comprises a first bandwidth requirement, and wherein the first bandwidth requirement is a bandwidth used for completing transmission of a first service;
  obtain a first bandwidth request message according to the second bandwidth request message, wherein the first bandwidth request message comprises the first bandwidth requirement;
  send the first bandwidth request message to a bandwidth allocation apparatus;
  receive a first bandwidth response message sent by the bandwidth allocation apparatus, wherein the first bandwidth response message comprises first bandwidth grant information, and wherein the first bandwidth grant information is information about a bandwidth that is allocated to the user-side device and that corresponds to the first service;
  obtain a second bandwidth response message according to the first bandwidth response message, wherein the second bandwidth response message comprises the first bandwidth grant information; and
  send the second bandwidth response message to the user-side device.

18. The message conversion apparatus according to claim 17, wherein the first bandwidth request message further comprises at least one of a first service identifier or first priority information, wherein the first priority information identifies a priority of a first service, and wherein the first service identifier identifies the first service.

19. The message conversion apparatus according to claim 17, wherein the first bandwidth request message and the first bandwidth response message are based on a same protocol, and wherein the first bandwidth request message is based on an internet protocol (IP) or an Ethernet protocol; and
  wherein the second bandwidth request message and the first bandwidth request message are based on different protocols, and wherein the second bandwidth response message and the second bandwidth request message are based on a same protocol.

20. The message conversion apparatus according to claim 17, wherein the first bandwidth response message further comprises second bandwidth grant information, and wherein the second bandwidth grant information is information about a bandwidth that is allocated to the user-side device and that corresponds to a second service and
  wherein the programming instructions further instruct the processor to:
    receive a second bandwidth requirement sent by the user-side device, wherein the second bandwidth requirement is a bandwidth used for completing transmission of the second service;
    add the second bandwidth requirement to the first bandwidth request message;
    obtain the second bandwidth grant information from the first bandwidth response message; and
    send the second bandwidth grant information to the user-side device.

\* \* \* \* \*

UNITED STATES PATENT AND TRADEMARK OFFICE
CERTIFICATE OF CORRECTION

PATENT NO. : 11,310,780 B2
APPLICATION NO. : 16/809017
DATED : April 19, 2022
INVENTOR(S) : Ruobin Zheng Page 1 of 1

It is certified that error appears in the above-identified patent and that said Letters Patent is hereby corrected as shown below:

In the Claims

Claim 13, Column 26, Line 53; delete "is used to identify".

Claim 13, Column 26, Lines 54-55; delete "is used to identify".

Signed and Sealed this
Twenty-eighth Day of June, 2022

Katherine Kelly Vidal
*Director of the United States Patent and Trademark Office*